US012134056B2

(12) United States Patent
Cloud et al.

(10) Patent No.: US 12,134,056 B2
(45) Date of Patent: Nov. 5, 2024

(54) FILTER ELEMENTS, COALESCING BAFFLES, FILTRATION VESSEL AND METHODS

(71) Applicants: Daniel M. Cloud, Weatherford, TX (US); Stephen Gregory Jeane, Mineral Wells, TX (US); Jack David Burns, Aledo, TX (US)

(72) Inventors: Daniel M. Cloud, Weatherford, TX (US); Stephen Gregory Jeane, Mineral Wells, TX (US); Jack David Burns, Aledo, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 269 days.

(21) Appl. No.: 17/328,074

(22) Filed: May 24, 2021

(65) Prior Publication Data

US 2021/0275956 A1    Sep. 9, 2021

Related U.S. Application Data

(63) Continuation of application No. 16/362,191, filed on Mar. 22, 2019, now Pat. No. 11,071,934, which is a
(Continued)

(51) Int. Cl.
*B01D 46/52*    (2006.01)
*B01D 46/00*    (2022.01)
(Continued)

(52) U.S. Cl.
CPC ......... *B01D 46/0031* (2013.01); *B01D 46/24* (2013.01); *B01D 46/2403* (2013.01);
(Continued)

(58) Field of Classification Search
CPC ........ B01D 2265/021; B01D 2265/026; B01D 2201/4076; B01D 46/2414;
(Continued)

(56) References Cited

U.S. PATENT DOCUMENTS 1,361,778 A * 12/1920 Schimmel ................ E06B 9/90
160/301
2,910,183 A    10/1959 Hayes
(Continued)

FOREIGN PATENT DOCUMENTS

CN    105451856 A    3/2016
CN    106139671 A    11/2016
(Continued)

OTHER PUBLICATIONS

Parker, Domnick Hunter; Tetpor Air, Air & Gas Filter Cartridges; Jan. 2014, 2 pages.
(Continued)

*Primary Examiner* — Dung H Bui
(74) *Attorney, Agent, or Firm* — Reinhart Boerner Van Deuren P.C.

(57) ABSTRACT

Improvements to filtration and vessels such as for filtration and coalescing of gas streams are shown. A filter element with a partial treated region and untreated region such as providing different surface energies or other filtration characteristics are provided. Various keying arrangements for compatibility and/or rotational locking are shown between the filtration vessel, a tubular coalescing baffle, and/or filter element. The tubular coalescing baffle also may include non-louvered pore structure, which provides for more even flow in a two stage type filtration vessel to prevent premature exiting and reduction of flow velocities along the second stage, and/or may additionally or alternatively include drainage apertures such as drain slot formed along a gravitational
(Continued)

bottom or otherwise to facilitate additional drainage of coalesced liquid as opposed to letting such liquid be forced through fluid velocity toward the open end of the tubular baffle.

22 Claims, 16 Drawing Sheets

Related U.S. Application Data continuation-in-part of application No. 15/694,260, filed on Sep. 1, 2017, now Pat. No. 10,343,096, which is a continuation of application No. 14/302,606, filed on Jun. 12, 2014, now Pat. No. 9,815,012.

(60) Provisional application No. 61/838,716, filed on Jun. 24, 2013.

(51) Int. Cl.
    B01D 46/24    (2006.01)
    B01D 46/58    (2022.01)
    B01D 46/62    (2022.01)
    B01D 46/64    (2022.01)

(52) U.S. Cl.
    CPC ...... *B01D 46/2411* (2013.01); *B01D 46/2414* (2013.01); *B01D 46/521* (2013.01); *B01D 46/58* (2022.01); *B01D 46/62* (2022.01); *B01D 46/64* (2022.01); *B01D 2265/021* (2013.01); *B01D 2265/026* (2013.01); *B01D 2271/027* (2013.01)

(58) Field of Classification Search
    CPC ............ B01D 46/0031; B01D 46/24; B01D 46/2403; B01D 46/2411; B01D 46/521; B01D 46/58; B01D 46/62; B01D 46/64; B01D 2271/027
    See application file for complete search history.

(56) References Cited

U.S. PATENT DOCUMENTS

| | | | |
|---|---|---|---|
| 3,202,206 A * | 8/1965 | Boulanger | E06B 9/44 160/263 |
| 3,226,917 A | 1/1966 | Donovan et al. | |
| 3,228,174 A * | 1/1966 | Perry | B01D 19/0052 55/484 |
| 3,429,108 A | 2/1969 | Larson | |
| 3,646,730 A * | 3/1972 | Reid | B01D 46/72 55/504 |
| 4,203,739 A | 5/1980 | Erdmannsdorfer | |
| 4,433,987 A | 2/1984 | Lenox | |
| 4,464,263 A | 8/1984 | Brownell | |
| RE31,966 E * | 8/1985 | Sillers, Jr. | B01D 46/2407 55/357 |
| 4,762,162 A | 8/1988 | Chochrek | |
| 4,934,433 A | 6/1990 | Aboul-Nasr | |
| 5,129,923 A | 7/1992 | Hunter et al. | |
| 5,238,474 A | 8/1993 | Kahlbaugh et al. | |
| 5,800,584 A | 9/1998 | Hinderer et al. | |
| 5,803,939 A | 9/1998 | Huning | |
| 5,827,430 A | 10/1998 | Perry, Jr. et al. | |
| 5,919,284 A | 7/1999 | Perry, Jr. et al. | |
| 5,935,284 A | 8/1999 | Tokar et al. | |
| 6,004,366 A | 12/1999 | Engel | |
| 6,007,608 A | 12/1999 | Johnson | |
| 6,022,474 A | 2/2000 | MacKelvie | |
| 6,168,647 B1 | 1/2001 | Perry, Jr. et al. | |
| 6,422,395 B1 | 7/2002 | Verdegan et al. | |
| 7,014,685 B2 | 3/2006 | Burns et al. | |
| 7,108,738 B2 | 9/2006 | Burns et al. | |
| 7,524,349 B2 | 4/2009 | Schrage | |
| 8,163,056 B2 | 4/2012 | Coulonvaux et al. | |
| 8,273,143 B2 | 9/2012 | Coulonvaux et al. | |
| 8,936,661 B2 * | 1/2015 | Burns | B01D 46/2414 55/482 |
| 9,610,526 B2 * | 4/2017 | Burns | B01D 46/2403 |
| 9,815,012 B2 | 11/2017 | Cloud et al. | |
| 10,159,923 B2 * | 12/2018 | Ruhland | B01D 46/0005 |
| 10,343,096 B2 | 7/2019 | Cloud et al. | |
| 11,071,934 B2 | 7/2021 | Cloud et al. | |
| 2002/0046816 A1 | 4/2002 | Judkins | |
| 2002/0134244 A1 | 9/2002 | Gu | |
| 2003/0226800 A1 * | 12/2003 | Brown | B01D 29/58 210/497.01 |
| 2004/0031252 A1 | 2/2004 | Heikamp | |
| 2005/0172590 A1 | 8/2005 | Burns et al. | |
| 2005/0172810 A1 * | 8/2005 | Burns | B01D 29/114 55/357 |
| 2007/0137488 A1 | 6/2007 | Streiff | |
| 2009/0051057 A1 | 2/2009 | Kim et al. | |
| 2009/0100813 A1 | 4/2009 | Iddings et al. | |
| 2009/0101567 A1 | 4/2009 | Benson et al. | |
| 2009/0126325 A1 | 5/2009 | Rinaldi et al. | |
| 2009/0158926 A1 | 6/2009 | Taylor et al. | |
| 2009/0212148 A1 | 8/2009 | Lebert | |
| 2010/0181031 A1 | 7/2010 | Cannaverde | |
| 2010/0251676 A1 | 10/2010 | Cho | |
| 2010/0269538 A1 | 10/2010 | Suzuki et al. | |
| 2011/0163037 A1 | 7/2011 | Mason | |
| 2012/0060453 A1 | 3/2012 | Holzmann et al. | |
| 2012/0210688 A1 | 8/2012 | Burns et al. | |
| 2013/0025246 A1 * | 1/2013 | Burns | B01D 29/232 55/498 |
| 2013/0055693 A1 | 3/2013 | Clarke et al. | |
| 2013/0062273 A1 | 3/2013 | Burns et al. | |
| 2013/0081990 A1 * | 4/2013 | Roesgen | B01D 35/30 210/232 |
| 2013/0269530 A1 | 10/2013 | Schulze et al. | |
| 2013/0292065 A1 | 11/2013 | Perkowitz | |
| 2014/0165516 A1 * | 6/2014 | Clarke | B01D 46/2414 55/498 |
| 2014/0260994 A1 | 9/2014 | Grider et al. | |
| 2014/0298612 A1 * | 10/2014 | Williams | B01D 46/2414 55/498 |
| 2014/0305858 A1 * | 10/2014 | Downs | B01D 29/21 210/232 |
| 2014/0373714 A1 | 12/2014 | Cloud et al. | |
| 2016/0038862 A1 * | 2/2016 | Barnwell | B01D 46/2414 210/232 |
| 2016/0096133 A1 | 4/2016 | Burns | |
| 2017/0144094 A1 * | 5/2017 | Dye | B01D 46/0005 |
| 2017/0296950 A1 * | 10/2017 | Benner | B01D 35/0276 |
| 2017/0361258 A1 | 12/2017 | Cloud et al. | |
| 2020/0108701 A1 | 4/2020 | Pepe et al. | |
| 2021/0187423 A1 * | 6/2021 | Besson | B01D 46/2414 |

FOREIGN PATENT DOCUMENTS

| | | |
|---|---|---|
| CN | 106413840 A | 2/2017 |
| CN | 108290099 A | 7/2018 |
| DE | 102010045481 A1 | 3/2012 |
| DE | 102011012633 A1 | 8/2012 |
| EP | 1118369 A1 | 7/2001 |
| JP | 2013215731 A | 10/2013 |
| WO | WO 2005/077491 A1 | 8/2005 |
| WO | WO 2009/014982 A1 | 1/2009 |

OTHER PUBLICATIONS

Parker; Glass-Mate Cartridges, Absolute-rated and economical filtration with pleated microglass; 2017; 2 pages.
Prior Sales Information Summary for Glass-Mate Cartridges & Tetpor Air Air & Gas Filter Cartridges; Jan. 2014.
"Mechanical Engineering Cognition"; Qiang Jianguo, Higher Education Press; Apr. 30, 2013.
"Basics of Mechanical Technology Application"; Wang Xueyan et al., Beihang University Press; Mar. 31, 2013.
U.S. Appl. No. 14/302,606, filed Jun. 12, 2014, Patented.

(56) References Cited

OTHER PUBLICATIONS

U.S. Appl. No. 15/694,260, filed Sep. 1, 2017, Patented.
U.S. Appl. No. 16/362,191, filed Mar. 22, 2019, Patented.

* cited by examiner

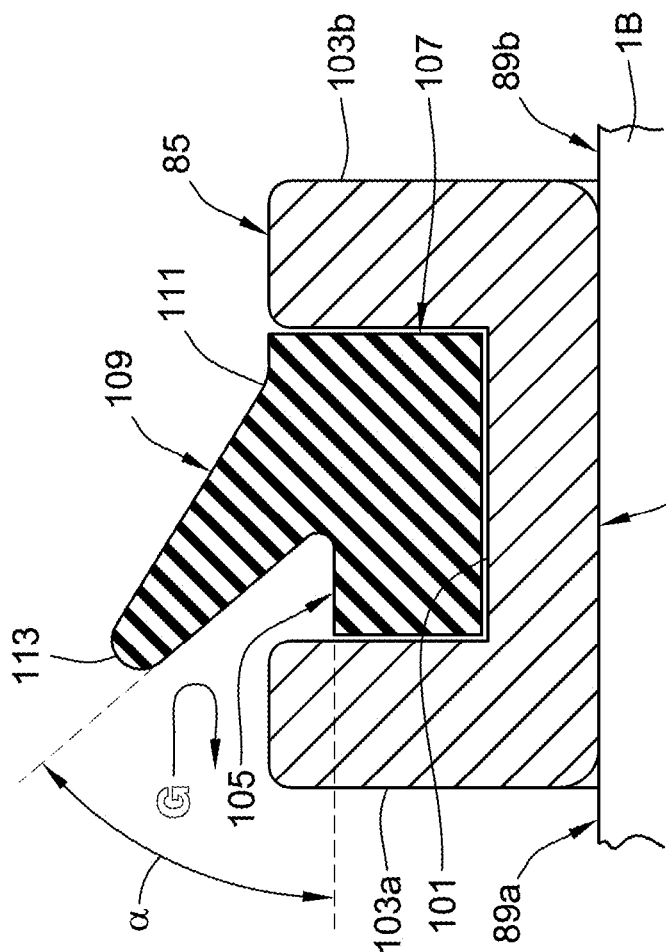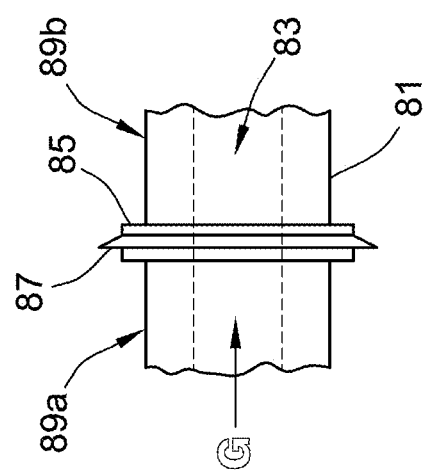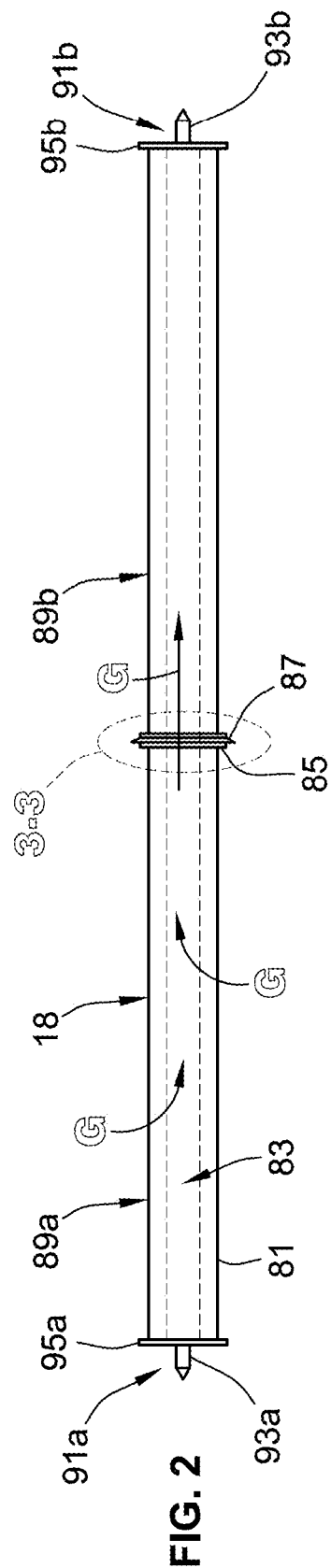

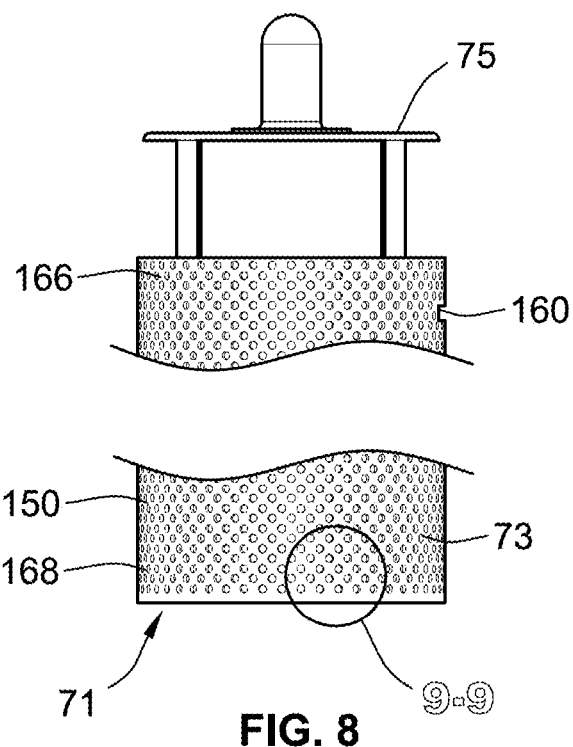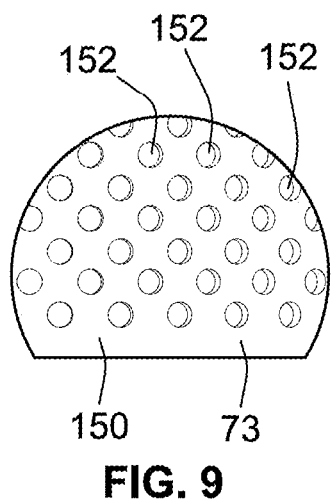
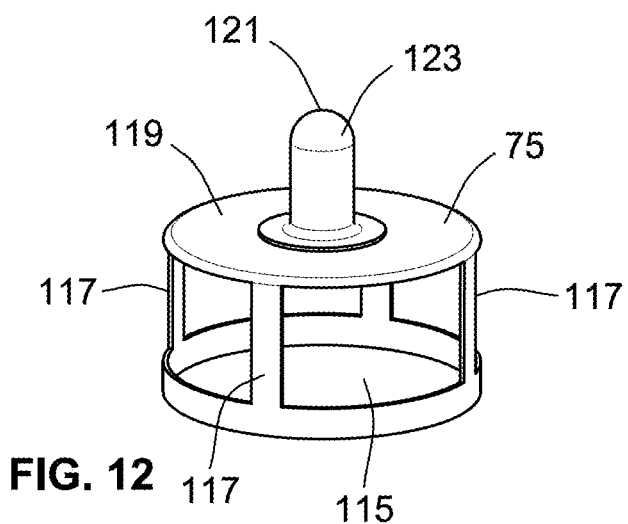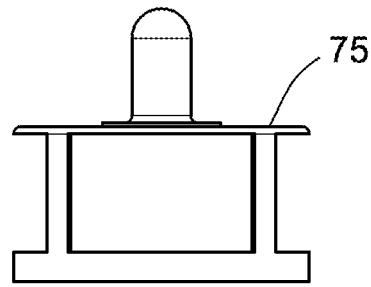
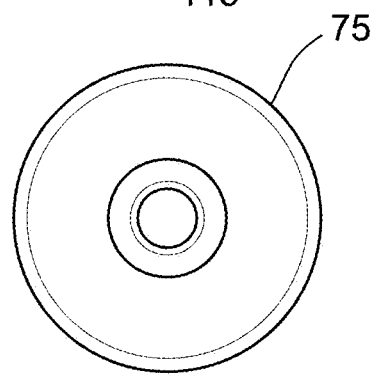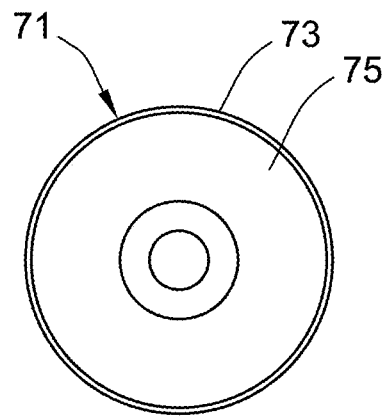

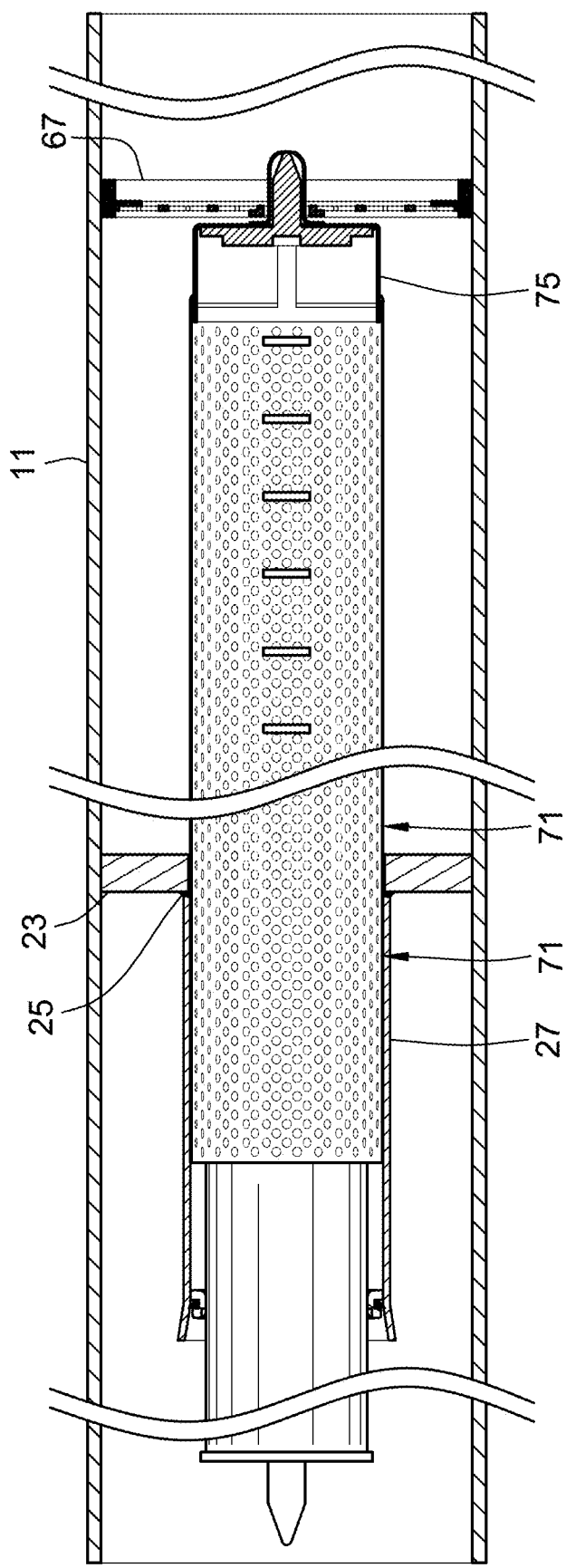

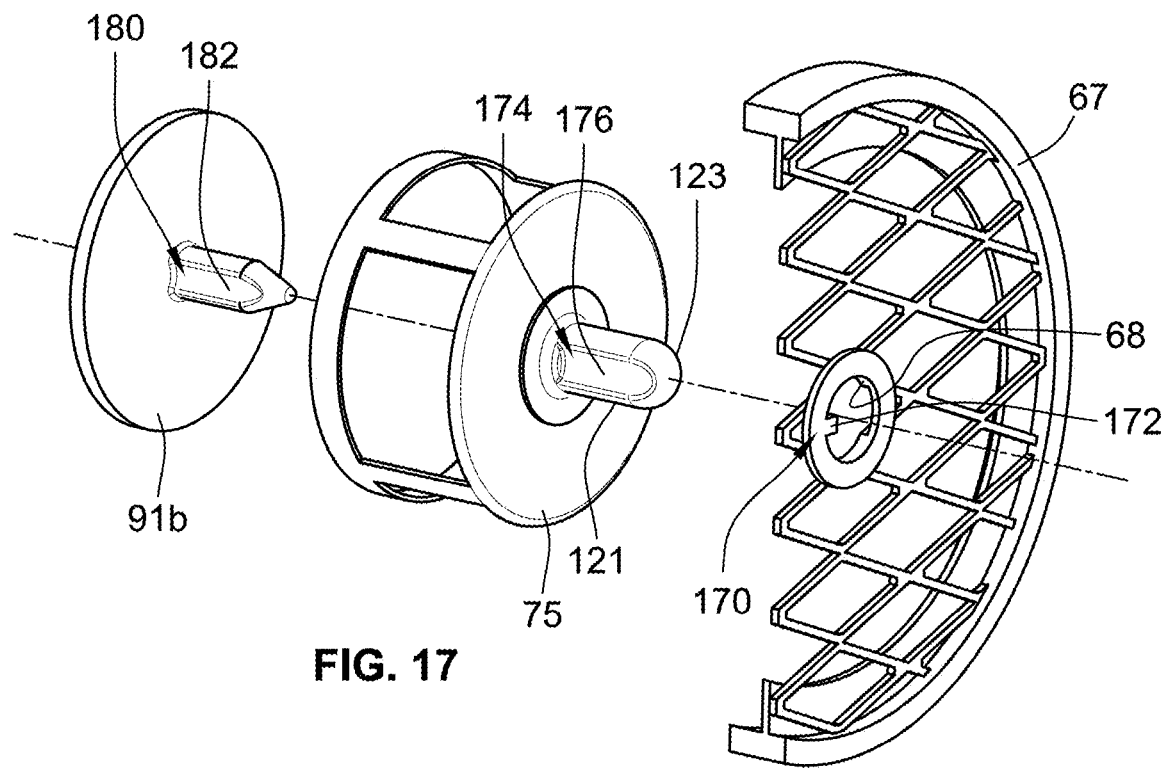
FIG. 17
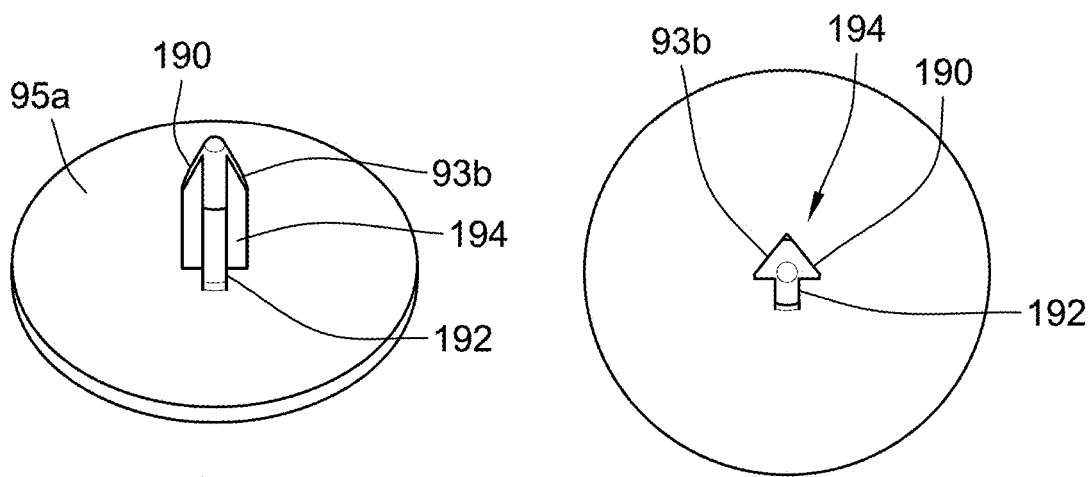
FIG. 18
FIG. 19
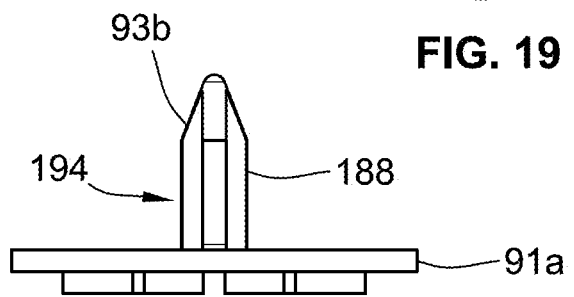
FIG. 20

FILTER ELEMENTS, COALESCING BAFFLES, FILTRATION VESSEL AND METHODS

CROSS-REFERENCE TO RELATED PATENT APPLICATIONS

This patent application is a continuation of U.S. patent application Ser. No. 16/362,191, filed Mar. 22, 2019, published as US 2019/0217237, which is a continuation-in-part of U.S. patent application Ser. No. 15/694,260, filed Sep. 1, 2017, patented as U.S. Pat. No. 10,343,096, which is a continuation of U.S. patent application Ser. No. 14/302,606, filed Jun. 12, 2014, patented as U.S. Pat. No. 9,815,012 which claims the benefit of U.S. Provisional Patent Application No. 61/838,716, filed Jun. 24, 2013. The entire teachings and disclosures of all applications referenced above are incorporated herein by reference thereto.

FIELD OF THE INVENTION

This invention generally relates to filtration vessels, coalescing baffles, and/or filter elements and methods associated with the use.

BACKGROUND OF THE INVENTION

Filtration vessels and coalescers are generally known in the prior art such as shown in U.S. Pat. No. 6,168,647 to Perry Jr. et al.; U.S. Publication Number 2012/0210688 to Burns et al.; U.S. Publication Number 2013/0062273 to Burns et al.; and U.S. Pat. No. 7,108,738 to Burns et al., the entire disclosures of each of these references being incorporated by reference as the different aspects of the present invention may be employed and improvements apply to these prior known filtration vessels and coalescing systems.

Certain aspects are also particularly applicable to a two stage filtration system such as shown in the '647 patent and the '688 publication. These particular types of filtration vessels are known and sold under the name GEMINI available from PECOFacet (US), Inc., a CLARCOR company located in Mineral Wells, Texas. Generally, in these types of systems, a gaseous fluid such as natural gas or other industrial gases are forced through different filter stage elements at high pressure allowing for various contaminant removal from the gaseous fluid. Oftentimes, the removal involves removal of oils and other hydrocarbons including crude oil for example, that may be entrained as droplets within the gas stream. It is quite desirable to obtain a high efficiency of removal while satisfying sufficient flow and production rates through the vessel.

Currently, with many of the production sites, there are radical hydrocarbons that are a lot harder to coalesce such as in the fracking regions and certain oil and gas production regions. While GEMINI vessels existing such as covered by the aforementioned '688 and '647 patents or publications provide for a certain amount of filtration and capabilities, further improvements are discussed herein.

BRIEF SUMMARY OF THE INVENTION

In one aspect the present invention provides for a tubular baffle that comprises a tubular extension. A plurality of pores is formed into the tubular extension. At least one drainage aperture is formed into the tubular extension. The tubular extension comprises regions of pores on opposed axial sides of the at least one drainage aperture. Each drainage aperture is larger in flow area than individual ones of the pores.

The at least one drainage aperture can include a plurality of drainage apertures. The tubular extension can include a series of drainage apertures arranged in axial spaced relation. This provides multiple opportunity for liquids to drain and exit the larger drainage apertures.

The tubular baffle may further include a downstream portion comprising the series of drainage slots and an upstream portion at least ⅕ of a length of the tubular extension that is free of the series of drainage apertures.

The porosity of the tubular extension may be between 20% and 40% and further can be between 28% and 35%.

In one embodiment, no louvers cover the pores.

The at least one drainage aperture may intersect and thereby may connect individual pores. However, this feature may also be applied to such louvered applications as in the prior art mentioned in the background.

The at least one drainage aperture can extend at least partially along a gravitational bottom of the tubular baffle as installed in a filtration vessel.

In one embodiment, each drainage aperture may comprise a slot having a length between 1 to 4 inches and a width between ⅛ to ½ inches. The length of each slot may extend circumferentially and the width of each slot may extend axially. For many production/industrial high pressure vessels, the tubular extension can have a diameter of between 3 and 8 inches and a length of at least 1 and ½ feet.

The tubular baffle may have at least one drainage aperture that covers less than ⅓ a circumference of the tubular baffle.

The baffle may further comprise an orientation device orienting the at least one slot at a predetermined gravitational bottom relative to the orientation device.

The tubular extension may comprise first and second open ends and further include a cap portion coupled to one open end. The cap portion can include an end plate with a post projecting from one side and a cup wall with windows projecting from a second opposite side. A porosity of the cup wall via the windows may be at least twice as great as a porosity of the tubular extension. This large flow capacity at the downstream end can encourage axial flow toward the downstream end and axial flow through the element to the downstream end.

The tubular baffle may further include a key arranged at a predetermined orientation relative to the at least one drainage aperture that orients the at least one drainage aperture at a predetermined gravitational bottom relative to the key. In an embodiment, the key may be formed into the post and may comprise an axially extending groove formed into the post.

The tubular baffle and/or a filter element may further include a directional indication formed on the end plate or end cap portion on the second opposite side oriented to indicate the predetermined orientation.

In another aspect the present invention provides for a filtration assembly incorporating such a tubular extension. The filtration assembly may further include a filter element that comprises a ring of filter media with an internal central flow passage. The filter element can have a first portion projecting into and received by the tubular extension and a second portion projecting outside of a first open end of the tubular extension. The filtration assembly may further comprise a coalescing collection chamber formed between the filter element and the tubular extension. The filter element may include a third portion projecting through a second open end of the tubular extension.

Another aspect of the present invention is directed toward a method of coalescing using the filtration assembly. The method may comprise flowing a gas stream through though the filter element having entrained liquid droplets therein. The method further comprises flowing the gas stream radially outward through the ring of filter media while coalescing the entrained liquid droplets along the way. The flow of the flowing gas stream develops moving axially through the coalescing collection chamber and drives the entrained liquid droplets along the tubular extension toward the second open end. The method further includes draining the entrained liquid droplets through the at least one drainage aperture.

The method may include orienting the at least one drainage aperture at a gravitational bottom of the tubular extension and directing the flowing gas stream to flow axially along the first and second portions of the filter element.

In an embodiment, fifty percent to seventy percent of the flowing gas stream may exit from the first portion and thirty percent to fifty percent of the flowing gas stream may exit from the second portion. This can reduce radial flow velocity out through the element and/or baffle by spreading the radial flow over the length of the element more evenly. This reduced flow velocity prevents or reduces the likelihood of re-entraining droplets or atomizing of liquid droplets due to the slower more controlled flow.

A series of drainage apertures may be aligned in axial spaced relation along a region of the tubular extension. As fluid flows along, there are then several opportunities for liquids to drain as opposed to flowing to the end where re-atomization may occur.

In another embodiment the present invention provides for a multiple stage filter element assembly that comprises a filtration vessel that includes a partition dividing the filtration vessel into a first stage and a second stage. There may be at least one opening in the partition. The multiple stage filter element may further include an inlet port in fluid communication with the first stage and an outlet port in fluid communication with the second stage. A filter element (e.g. one or more filter elements) may be disposed in the filtration vessel and extending through the partition. A tubular baffle can surround the filter element. The tubular baffle may comprise a non-louvered perforated extension having a plurality of pores.

Fluid flow in the multiple stage filter element may enter the first stage through the inlet port and pass radially inward through the filter element and along an interior chamber defined within the filter element. It may pass radially outward through the filter element and an intermediate chamber that may be defined between the tubular baffle and the non-louvered perforated extension. Thereafter it may flow to a low pressure chamber surrounding the tubular baffle. The low pressure chamber has a lower pressure than the intermediate chamber during use.

The multiple stage filter element assembly may have a porosity of the non-louvered perforated extension that is between 20% and 40% to provide a more even flow through the filter element over an extension of the filter element within the second stage. It may further have the porosity between 28% and 35%.

Further, the tubular baffle can include drainage apertures. Each drainage aperture may be larger in flow area than individual ones of the pores and may connect individual ones of the pores. In one embodiment, the drainage apertures extend at least partially along a gravitational bottom of the tubular baffle.

The multiple stage filter assembly may have pores that have a pore size of between 0.002 and 0.52 square inches. The pore size may be selected relative to porosity to control radial flow velocities and provide back pressure between the element and the baffle to control such velocities and spread fluid flow more evenly over the length of the filter element.

The non-louvered perforated tubular extension may comprise first and second open ends. There may be a cap portion coupled to one open end. The cap portion may include an end plate with a post projecting from one side and a cup wall with windows projecting from a second opposite side. A porosity of cup wall via the windows may be at least twice as great as a porosity of the non-louvered perforated extension.

The non-louvered perforated extension can extend through the partition. The filter element may have a first portion projecting into and received by the non-louvered perforated extension. It may have a second portion projecting outside of a first open end of the non-louvered perforated extension. A coalescing collection chamber may be formed between the filter element and the non-louvered perforated extension. The filter element may further comprise a third portion that projects through the second open end of the non-louvered perforated extension.

In yet another embodiment or aspect the present invention provides for keying. In one embodiment, a tubular baffle that comprises a tubular extension with a plurality of pores formed into the tubular extension. The tubular extension comprises first and second open ends. A cap portion is coupled to one of the first and second open ends. The cap portion comprises an end plate with a post projecting from one side and a cup wall with windows projecting from a second opposite side. A porosity of the cup wall via the windows are at least twice as great as a porosity of the tubular extension. A key is formed on the cap portion.

In one embodiment, the key may be arranged at a predetermined orientation relative to the tubular extension. For example, the tubular extension may have a bottom portion with a greater drainage capability relative to a remainder of the tubular extension.

The key can be formed into the post. The key may comprise a non-circular keyed structure formed along the post and extending axially. The keyed structure may also comprise an axially extending groove formed into the post.

Further, the post can define a cavity that is formed into the second opposite side for mounting a filter element. The keyed structure can extend into the cavity as a projection from a cylindrical surface of the cavity.

The tubular baffle (or the filter element in an embodiment) may further comprise a directional indication that is formed on the end plate portion on the second opposite side and oriented to indicate the predetermined orientation.

The key may comprise a detent formed at a predetermined angular position relative to a central axis about which the tubular extension surrounds. The post may comprise a tapered tip and a cylindrical body. The key may extend axially into the cylindrical body and the tapered tip.

In yet another embodiment the present invention provides for a multiple stage filter element assembly that comprises a keyed tubular baffle. The multiple stage filter element assembly may further comprise a filtration vessel. A partition divides the filtration vessel into a first stage and a second stage. There is at least one opening in the partition. An inlet port is in fluid communication with the first stage. An outlet port is in fluid communication with the second stage. There is a filter element disposed in the vessel and extending through the partition. The tubular baffle surrounds the filter element and is secured by a support grid. The support grid provides a mounting opening to receive the post and a corresponding key keying with the key. The key may rotationally lock the tubular baffle relative to the filtration vessel and thus provide a predetermined orientation to the tubular baffle.

The multiple stage filtration vessel may further comprise drainage apertures formed along the tubular extension. The key may orient the drainage apertures at a gravitational bottom of the extension to facilitate drainage.

Alternatively or additionally, the key may also key with an end cap of the filter element and rotationally lock the filter element and the tubular baffle. The corresponding key may comprise a tab projecting from a circular surface of the mounting opening.

In still another embodiment the invention provides for a filter element that comprises a ring of filter media with an internal central flow passage. An end cap closes an end of the ring of filter media. The end cap comprises a mounting post and a key is formed along the mounting post.

The mounting post may comprise a circular surface, and further comprise a detent formed into the mounting post that disrupts the circular surface and extends axially along the circular surface.

In one embodiment, the mounting post may comprise an axially extending groove to provide for the key. The mounting post may comprise a tapered tip and a cylindrical body and the key structure may extend axially into the cylindrical body and the tapered tip.

The key may provide means for keying with a tubular baffle having a perforated extension. Without the key, the filter element will not interfit and properly mount with the tubular baffle.

The ring of filter media may extend horizontally along an axis and comprise an upper half on one side of a horizontal plane and intersect the axis and a bottom half on an opposite side of the horizontal plane. The ring of filtration media of the upper half and the bottom half may be different with at least one different filtration, coalescing or flow characteristic.

The key may be positioned at a predetermined position relative to the upper half and bottom half to locate the bottom half at a gravitational bottom when in use. The bottom half of the ring of filter media may comprise a treated region and the upper half may comprise an untreated region. The treated region may comprise a fluorocarbon treatment. The fluorocarbon treatment may include at least one of dipping, aerosol vacuum application, vapor phase adhesion or plasma coating. The treated region can additionally or alternatively comprise an additional media to provide such a different filtering characteristic.

Another aspect of the present invention is directed toward a method of using such a keyed filter element. The method further comprises installing the filter element into a tubular baffle. The tubular baffle can include a tubular extension and a plurality of pores formed into the tubular extension. The method further comprises keying the filter element to the tubular extension. The keying may rotationally lock the filter element to the tubular extension in an embodiment.

The method can further comprise installing the tubular baffle into a support grid in a filtration vessel, keying the tubular baffle to the support grid and rotationally locking the tubular extension to the support grid. The tubular baffle may comprise a post having a cavity receiving the mounting post of the filter element. The cavity may include a circular surface and a radially inward projecting detent.

The key of the filter element can include a clearance void formed into the mounting post to receive the projecting detent. For example, the clearance void can comprise a groove or a flat or other non-round key structure.

In still another embodiment the present invention provides for a filter element that comprises ring of filter media with an internal central flow passage. The filter media includes a treated region and an untreated region. The treated region has a surface energy different than the untreated region with an increased wettability for hydrocarbons.

In one embodiment, the ring of filter media extends horizontally along an axis and comprises an upper half on one side of a horizontal plane intersecting the axis and a bottom half on an opposite side of the horizontal plane. The bottom half comprises the treated region. Greater than 50% of the upper half is free of the treated region.

For orientation of such an embodiment, the filter element may further comprise an orientation device at a predetermined angular orientation relative to the treated region adapted to locate the treated region along a gravitational bottom when installed in a filtration vessel.

The orientation device can include a key formed on an end cap of the filter element. The orientation device can additionally or alternatively include a directional indication marked on the filter element.

The ring of filter media may comprise a tube wound depth media surrounding an axis having a plurality of layers. Alternatively or additionally, the ring of filter media may include a pleated ring portion.

In another embodiment, the ring of filter media may extend horizontally along an axis and include a first stage portion and a second stage portion. The portions may be unitarily formed with each other or separate elements, with a seal element separating the first stage portion from the second stage portion. The treated region extends primarily over the second stage portion.

In a further such embodiment, the treated region may extend only over a portion of the second stage portion. The second stage portion can also include the untreated region. The treated region may be confined to one axial end portion of the second stage portion. A second axial end portion of the second stage portion may be only untreated and form part of the untreated region.

In an embodiment, the first stage portion can be free of the treated region and comprise only the untreated region. The treated region may cover less than half of the second stage portion. The first stage portion and the second stage portion may be formed integrally with each other as a tubular wrap of filter media comprising multiple layers.

The filter element may further comprise a means for keying with a tubular baffle having a perforated extension. Further, it may be that without the means for keying the filter element will not interfit and properly mount with the tubular baffle. The treated region comprises a fluorocarbon treatment.

The fluorocarbon treatment may comprise at least one of dipping, aerosol vacuum application, vapor phase adhesion or plasma coating. Additionally, or alternatively, the treated region may comprise an additional filter media to provide the treated region to modify the surface energy along the treated region.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 2 is a side view of the separator/coalescer filter element of FIG. 1:

FIG. 2b showing a treated region on the second stage portion of the filter element and an untreated region on the first stage of the filter element, and FIG. 2c showing a treated region on a downstream axial end portion of the second stage with untreated regions on an upstream axial end portion of the downstream region and an untreated region as well on the first stage.

FIG. 3 is an enlarged view of the chevron-type seal and seal holder of the separator/coalescer filter element of FIG. 2 taken at circle III:

FIG. 4 is a partial cross-sectional view of the chevron-type seal and the seal holder of FIGS. 2 and 3.

FIG. 8 is a side view of an entire assembly of the tubular impingement baffle including the perforated extension and the basket cap portion, which is employed in the filtration vessel illustrated in FIG. 1, with the pore size being exaggerated:

FIG. 9 is an enlarged detail view of the perforated sheet metal plate used in the tubular baffle of FIG. 8 taken about detail A showing the perforated pores better, again with the pore size being enlarged for illustration purposes;

FIGS. 12-14 are additional views of the basket cap portion used in combination with the perforated tubular extension shown in FIG. 8:

FIG. 15 is an axial end view of the tubular baffle shown in FIG. 8:

FIG. 16 shows a partially schematic and cut away from a bottom view of a filtration vessel incorporating the tubular baffle with slots according to the embodiment of FIG. 8 which schematic may represent that shown in FIG. 1:

FIG. 17 shows an exploded assembly of a downstream support grid including straps carrying aperture, the basket cap portion of the coalescer and filter element end cap, all incorporating a keying system in accordance with an embodiment:

FIGS. 18-20 show perspective, end view and bottom elevation view respectively, of the inlet side end cap for the filter element, that may be used in conjunction at the opposite inlet end with the structure of FIG. 17 being employed at the outlet end:

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
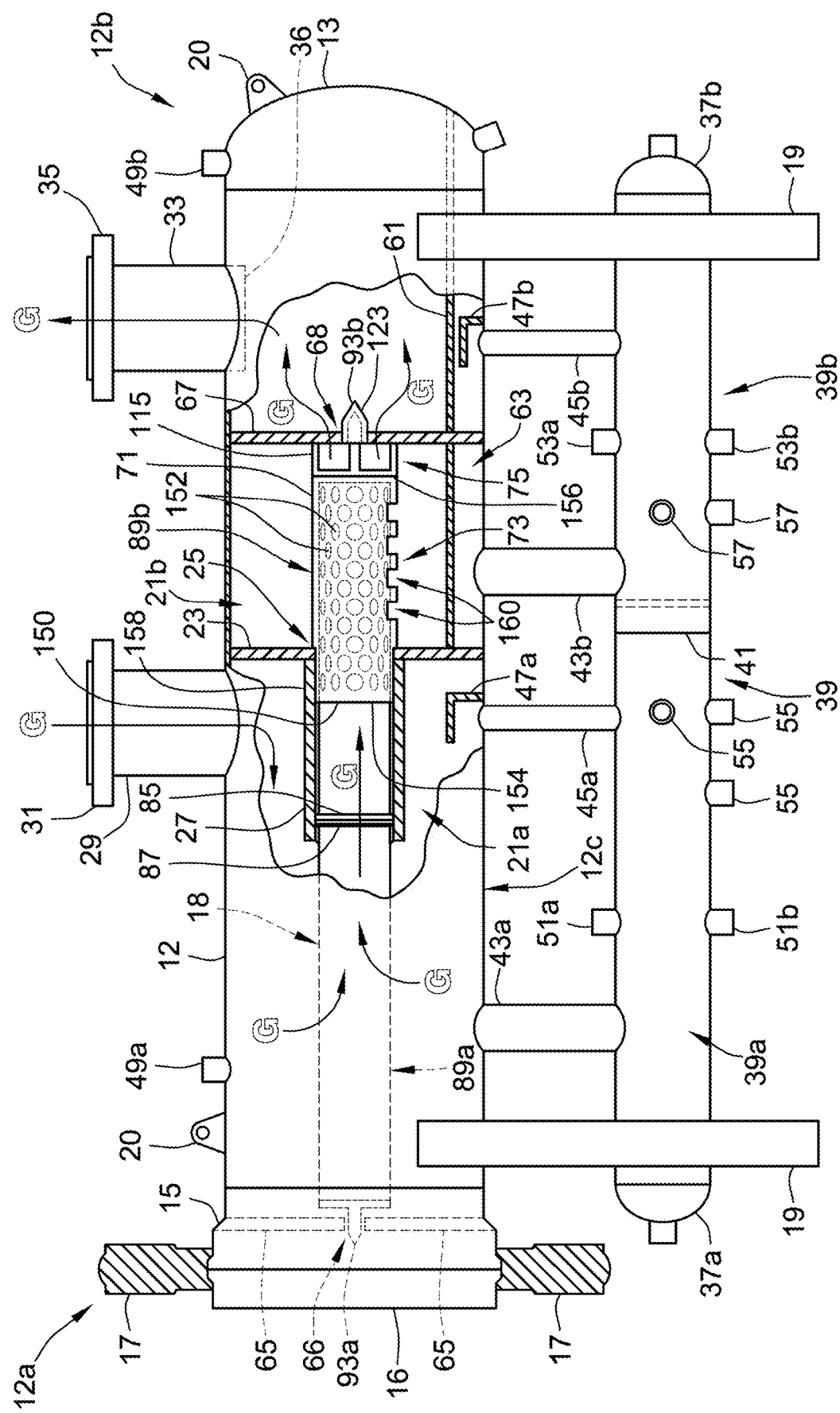
FIG. 1 is a side elevational view in partial section of a preferred embodiment of the multi-stage vessel and separator/coalescer filter element of the present invention.

Referring to FIG. 1 of the drawings, the numeral 11 designates the preferred embodiment of a multi-stage vessel for simultaneously filtering solids, separating liquids, pre-coalescing liquids, and coalescing liquids out of a gas stream according to the present invention. This may generally be in accordance with that described in U.S. Pat. No. 6,168,647 to Perry Jr. et al. or U.S. Publication No. 2012/0210688 to Burns et al, or as otherwise incorporated into GEMINI brand filtration vessels available from PECOFacet (US), Inc.

The flow of the gas stream is indicated throughout as arrow G. Multi-stage vessel 11 has a generally tubular hull 12 having an initially open interior. Hull 12 is enclosed on an inlet end 12a by a conventional closure member 15, preferably a releasable, quick-opening closure. Hull 12 is permanently enclosed on an outlet end 12b by a cap 13, preferably elliptical. Closure member 15 consists of a conventional head member 16 and a conventional clamping member 17. Head member 16 is releasably sealed to multi-stage vessel 11 by clamping member 17. Clamping member 17 may be released and head member 16 may be opened to allow access to the interior of hull 12. Clamping member 17 provides a fluid-tight seal between hull 12 and head member 16, preferably with a conventional O-ring (not shown). At least one and typically, a plurality of separator/coalescer filter elements 18 are disposed within hull 12, although one element 18 being shown in FIG. 1 to avoid confusion and too busy of drawings. For example, multiple filter elements, tubular baffles and holes in a partition of a two-stage filtration vessel are shown in the '688 publication to Burns.

In that regard, the vessel configuration, separator/coalescer filter elements 18 may generally be any of those filter elements as disclosed in U.S. Pat. No. 6,168,647 to Perry Jr. et al. or U.S. Publication No. 2012/0210688 to Burns et al, both assigned to the present assignee. For example, the filter element 18 may comprise a single continuous filter media tube as in Perry Jr. or a combination or first stage and second stage elements as in various embodiments of Burns et al, that together can form the filter element 18 discussed herein. However as shown in other figures and discussed, the filter element 18 preferably includes a key such as a detent that can key a tubular baffle in an embodiment. The detent may also rotationally lock therewith an embodiment.

Hull 12 is supported by saddle supports 19. A plurality of eyelets 20 are permanently attached to hull 12 to aid in hoisting multi-stage vessel 11 during manufacture, transportation, installation, and maintenance.

The interior of hull 12 is divided into a first stage 21a and a second stage 21b by a generally transverse partition 23. Partition 23 includes a plurality of openings 25. Although only a single separator/coalescer filter element 18 and filter guide 27 are shown, it should be understood that openings 25 can be arranged, e.g., in rows on partition 23. In a typical installation, four rows having two to four openings are present. A tubular filter guide 27 is aligned with each opening 25. Each filter guide 27 extends longitudinally a selected distance from partition 23 into first stage 21a. An inlet port 29 is disposed on hull 12 and opens into first stage 21a. Inlet port 29 terminates with an inlet flange 31. Inlet flange 31 is adapted to allow multi-stage vessel 11 to be connected to a conventional gas pipeline. Inlet port 29 is located near partition 23 so that as a gas stream flows through inlet port 29 into first stage 21a, the gas stream impinges upon filter guides 27. In this manner, filter guides 27 aid in the removal of solids and free liquids from the gas stream while protecting separator/coalescer filter elements 18 from erosion. This, as well as other functions of filter guides 27, will be explained in more detail below. An outlet port 33 is disposed on hull 12 and opens into second stage 21b. Outlet port 33 terminates with an outlet flange 35. Outlet flange 35 is adapted to allow multi-stage vessel 11 to be connected to a conventional gas pipeline. An annular collar 36 is aligned with outlet port 33 and extends into second stage 21b, thereby creating a barrier and preventing liquids from creeping along the interior surface of second stage 21 band escaping through outlet port 33. Multi-stage vessel 11 is preferably manufactured of steel materials which conform to published pressure-vessel standards, such as ASME Boiler and Pressure Vessel Code, Section 8, Division 1.

Disposed at an underneath portion 12c of hull 12 is a sump 39 for collecting the filtered solids, the separated liquids, the pre-coalesced liquids, and the coalesced liquids that are removed from the gas stream. Sump 39 is divided into a first-stage sump 39a and a second-stage sump 39b by an impermeable sump partition 41. First-stage sump 39a is generally tubular and is sealed on one end by a first-stage cap 37a. Typically, first-stage sump 39a collects separated liquids, pre-coalesced liquids, and solids not filtered by separator/coalescer filter element. Second-stage sump 39b is generally tubular and is sealed on one end by a second-stage cap 37b. Typically, second-stage sump 39b collects coalesced liquids.

A first-stage downcomer 43a provides fluid communication between first stage 21a and first-stage sump 39a. First-stage downcomer 43a allows drainage of the separated solids, the filtered liquids, and the pre-coalesced liquids from first stage 21a into first-stage sump 39a. A second-stage downcomer 43b provides fluid communication between second stage 21 band second-stage sump 39b. Second-stage downcomer 43b allows drainage of the coalesced liquids from second stage 21b into second-stage sump 39b. A first-stage sump vent 45a provides fluid communication between first stage 21a and first-stage sump 39a, and acts as a gas vent. First-stage sump vent 45a allows gas displaced from first-stage sump 39a to flow back into first stage 21a. A second-stage sump vent 45b provides fluid communication between second stage 21b and second-stage sump 39b, and acts as a gas vent. Second-stage sump vent 45b allows gas displaced from second-stage sump 39b to flow back into second-stage 21b. A first-stage vent baffle 47a prevents solids carried by the separated liquids and pre-coalesced liquids from flowing into first-stage sump 39a. A second-stage vent baffle 47b prevents mist from flowing back into second stage 21b from second-stage sump 39b.

Disposed on the upper side of hull 12 and in fluid communication with first stage 21a is a first-stage pressure-gauge port 49a. First-stage pressure-gauge port 49a is adapted to receive a conventional pressure gauge (not shown) for monitoring the pressure in first-stage 21a or the differential pressure. Likewise, located on the upper side of hull 12 and in fluid communication with second-stage 21b is a second-stage pressure gauge port 49b. Second-stage pressure-gauge port 49b is adapted to receive a conventional pressure gauge (not shown) for monitoring the pressure in second stage 21b or the differential pressure.

Continuing with reference to FIG. 1 in the drawings, first-stage gauge glass connections 51a and 51b are disposed opposite each other on the upper and lower sides of first-stage sump 39a and in fluid communication with first-stage sump 39a. First-stage gauge glass connections 51a and 51b are adapted to receive a conventional gauge glass (not shown) for monitoring the level of liquids and solids in first-stage sump 39a. Similarly, second-stage gauge glass connections 53a and 53b are disposed opposite each other on the upper and lower sides of second-stage sump 39b and in fluid communication with second-stage sump 39b. Second-stage gauge glass connections 53a and 53b are adapted to receive a conventional gauge glass (not shown) for monitoring the level of liquids in second-stage sump 39b. A plurality of first-stage sump connections 55, preferably operated by valves (not shown), for draining or siphoning solids, liquids, and pre-coalesced liquids out of first-stage sump 39a, are disposed on first-stage sump 39a. Similarly, a plurality of second-stage sump connections 57, preferably operated by valves (not shown), for draining or siphoning coalesced liquids and fine liquids out of second-stage sump 39b, are disposed on second-stage sump 39b. In addition, first-stage sump connections 55 and second-stage sump connections 57 allow level control instruments and other measuring devices to be inserted into first-stage sump 39a or second-stage sump 39b, respectively.

A screen member 61, preferably made of a woven steel material, is disposed in a lower portion 63 of second stage 21b. Screen member 61 extends substantially the entire length of second stage 21 band acts as a barrier to prevent coalesced liquids that have collected in lower portion 63 from becoming re-entrained in the gas stream.

A grid that may have plurality of first-stage support straps 65 are disposed in first stage 21a to support separator/coalescer filter elements 18. First-stage support straps 65 generally extend transversely across first stage 21a, and are connected to the interior of hull 12 by a snap fit or any suitable holding clip member (not shown) that does not require tools to release first-stage support straps 65. It should be understood that one or more first-stage support straps 65 may be connected together, or integrally connected, to form a single webbed network of first-stage support straps 65. First-stage support straps 65 are spatially disposed within first stage 21a, such that the gas stream may flow unabated around first-stage support straps 65. First-stage support straps 65 include a plurality of apertures 66 to receive separator/coalescer filter elements 18. First-stage support straps 65 are preferably made of rigid material, such as steel or metal. In addition, first-stage support straps 65 hold separator/coalescer filter elements 18 firmly in place, without longitudinal compression, thereby preventing longitudinal movement of separator/coalescer filter elements 18 in backflow situations.

Likewise, a grid comprising a plurality of second-stage support straps 67 are disposed in second stage 21b to support separator/coalescer filter elements 18. Second-stage support straps 67 generally extend transversely across second stage 21 band are connected to the interior of hull 12. As with first-stage support straps 65, one or more second-stage support straps 67 may be connected together, or integrally connected, to form a single webbed network of second-stage support straps 67. Second-stage support straps 67 are spatially disposed within second stage 21b such that the gas stream may flow unabated around second-stage support straps 67 toward outlet port 33. Second-stage support straps 67 include a plurality of apertures 68 to receive separator/coalescer filter elements 18 and associated tubular baffles 71.

A plurality of generally basket-shaped tubular baffles 71 are disposed in second stage 21b to prevent coalesced liquids and fine liquids from becoming re-entrained in the gas stream as the gas stream flows through second stage 21b toward outlet port 33. A separate tubular baffle 71 is associated with each separator/coalescer filter element 18 and each corresponding opening 25 in partition 23. Tubular baffles 71 are adapted to be inserted through tubular filter guides 27 from first stage 21a and into second stage 21b, where tubular baffles 71 are received and carried by second-stage support straps 67. Thus, once installed, tubular baffles 71 extend from second-stage support straps 67, through openings 25, past partition 23, and partially into filter guides 27. Tubular baffles 71 may be removed through filter guides 27 for cleaning, maintenance, and replacement.

Each tubular baffle 71 includes a perforated tubular extension 73 coupled to a basket cap portion 75. It should be understood that perforated tubular extension 73 and basket cap portion 75 may be integrally connected. Perforated tubular extension 73 is adapted to allow the gas stream to flow through, but to prevent coalesced liquids and fine liquids from escaping and becoming re-entrained into the gas stream. In one embodiment, this may accomplished by a plurality of annular louvers (not shown) disposed along the extent of perforated tubular extension 73 such as shown in U.S. Pat. No. 6,168,647. Louvers may be employed with either or both of the keying aspects and/or the drainage slot features. More preferably in one embodiment, a non-louvered perforated extension 73 is employed as shown with a plurality of pores that provide a controlled backpressure.

Tubular baffle 71 with pores and/or drain apertures, along with benefits will be discussed in more detail herein, particularly with respect to FIGS. 8-12 and 16.

Referring now to FIG. 2 in the drawings, a typical separator/coalescer filter element 18 of the present invention is illustrated. Separator/coalescer filter element 18 is preferably a tubular filter element (that may be either cylindrical tube and/or pleated having a filter wall 81 and a hollow core 83. Filter wall 81 of separator/coalescer filter element 18 preferably consists of multi-overlapped layers of non-woven fabric strips, which provide an outer cylindrical surface in one embodiment. The selected density and porosity of separator/coalescer filter elements 18 prevent solids and pre-coalesced liquids from passing through separator/coalescer filter elements 18 and into second stage 21b of multi-stage vessel 11. Thus, separator/coalescer filter elements 18 are of the same general type as those disclosed in U.S. Pat. No. 5,827,430, issued Oct. 27, 1998 to Perry, Jr., et al, both references of which are incorporated by reference. However, each separator/coalescer filter element 18 of the present invention is circumscribed by an annular seal holder 85. Seal holder 85 is preferably made of polyester and is permanently sealed, or affixed, to filter wall 81. Seal holder 85 is sealingly bonded to filter wall 81 by a heat treatment, but it should be understood that seal holder 85 may be sealed to filter wall by other conventional means, such as glue or adhesive. It is preferable that seal holder 85 does not compress the layers of separator/coalescer filter element 18. Seal holder releasably carries an annular seal 87, preferably a chevron-type seal, as will be explained in more detail below. Other seals and seal arrangements may be employed in other embodiments, as well as alternate filter elements including those disclosed U.S. Publication No. 2012/0210688 to Burns et al. A filter element as used herein may itself comprise two or more end to end elements as shown in Burns et al.

Seal holder 85 and seal 87 separate separator/coalescer filter element 18 into two portions: an inlet portion 89a (also referred to as first stage portion) and an outlet portion 89b (also referred to as second stage portion). It is not necessary that inlet portion 89a and outlet portion 89b are of the same length. Indeed, depending upon the application, it may be necessary to offset seal holder 85 and seal 87 from the axial center of separator/coalescer filter element 18. It is important to note that both inlet portion 89b and outlet portion 89b are of generally homogenous construction and thus integral and continuous: therefore, inlet portion 89a and outlet portion 89b are functionally identical in one embodiment, although the lengths of inlet portion 89a and 89b may vary. In other embodiments, first and second stage portions are in whole or part functionally different. When seal 87 is a chevron-type seal, inlet portion 89a and outlet portion 89b are determined by the orientation of seal 87, as will be explained in more detail below. On the other hand, if seal 87 is an O-ring, or some other type of seal whose functionality is independent of flow direction, then inlet portion 89a and outlet portion 89b may be interchangeable. It should be understood that due to differences in the sealing characteristics between a chevron-type seal and an O-ring type seal, the two seals may not be interchangeable for a given separator/coalescer element 18. O-rings or other seals may be employed through in some embodiments.

Inlet portion 89a terminates with a filter inlet cap 91a, and outlet portion 89b terminates with a filter outlet cap 91b. It is preferable that both filter inlet cap 91a and filter outlet cap 91b are identical, but for reasons explained below, filter inlet cap 91a and filter outlet cap 91b may be of varying configurations. Filter inlet cap 91a and filter outlet cap 91b form a fluid-tight seal with separator/coalescer filter element 18, such that all fluids in the gas stream must pass through filter wall 81. Filter inlet cap 91a has a filter inlet cap post 93a that protrudes longitudinally outward from separator/coalescer filter element 18. Filter inlet cap post 93a preferably tapers inwardly at its outermost extent. In a similar fashion, filter outlet cap 91b has a filter outlet cap post 93b that protrudes longitudinally outward from separator/coalescer filter element 18. Filter outlet cap post 93b preferably tapers inwardly at its outermost extent. Filter inlet cap 91a and filter outlet cap 91b are illustrated having a filter inlet cap flange 95a and a filter outlet cap flange 95b, respectively, although filter inlet cap 91a and filter outlet cap 91b may also be flush with filter wall 81.

Referring to FIG. 3 in the drawings, a blow-up view of circle III of FIG. 2 is illustrated. As mentioned above, inlet portion 89a and outlet portion 89b may be functionally identical. When seal 87 is a chevron-type seal, as is preferable, the orientation of seal 87 determines which portion of separator/coalescer filter element 18 represents inlet portion 89a, and which portion of separator/coalescer filter element 18 represents outlet portion 89b. Although the orientation of chevron-type seal 87 determines which portion of separator/coalescer filter element 18 represents inlet portion 89a, it should be understood that other means of ensuring proper installation of separator/coalescer filter element exist. For example, filter inlet cap post 93a and filter inlet cap post 93b may be of different sizes or shapes, or filter inlet cap flange 95a and filter outlet cap flange 95b may be of different sizes or shapes.

When seal 87 is a chevron-type seal, seal 87 includes a seal base portion 105, a seal vertex portion 107, and a seal cone portion 109. Seal base portion 105 and seal cone portion 107 are integrally joined together at seal vertex portion 107. Seal cone portion 109 is preferably frusto-conical-shaped, having a small-diameter end 111, and a large-diameter end 113. It is preferable that seal base portion 105 and seal cone portion 109 form an angle α of about 60°.

In order for seal 87 to operate properly, it is necessary that seal 87 be installed into seal channel 101 such that large-diameter end 113 extends in a direction opposite of the direction of flow of the gas stream. Because large-diameter end 113 extends downward in FIG. 4, the lower end of separator/coalescer filter element 18 becomes inlet portion 89a, and the upper end of separator/coalescer filter element 18 becomes outlet portion 89b. Large-diameter end 113 is flexible and can be compressed toward seal base portion 105. Thus, when separator/coalescer filter element 18 is installed into multi-stage vessel 11 (see FIG. 1), large-diameter end 113 is compressed against filter guide 27, thereby forming a fluid-tight seal between first stage 21a and second stage 21b. Seal holder 85 and seal 87 allow individual tubular separator/coalescer filter elements 18 to filter solids, separate liquids, and pre-coalesce liquids as the gas stream flows through filter wall 81 of inlet portion 89a from outside to inside in first stage 21a, and simultaneously coalesce fluids and fine liquids as the gas stream flows back through filter wall 81 of outlet portion 89b from inside to outside in second stage 21b.

Figure 5:
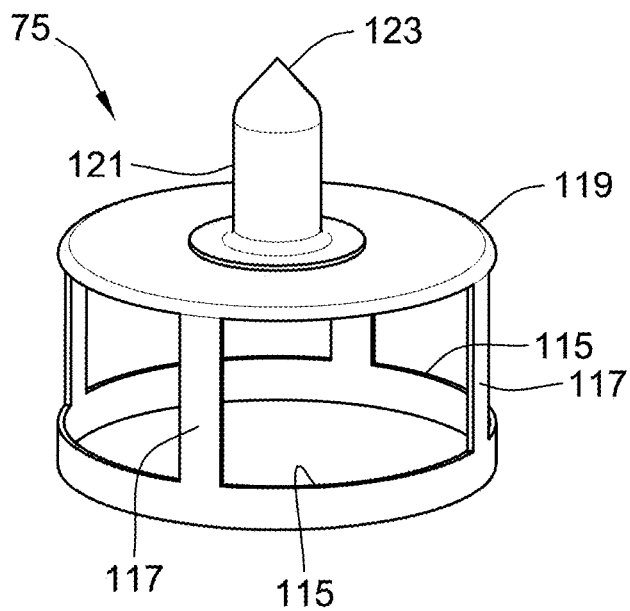
FIG. 5 is a perspective view of the basket cap portion for the flow diffuser basket of the multi-stage vessel of FIG. 1.
Figure 6:
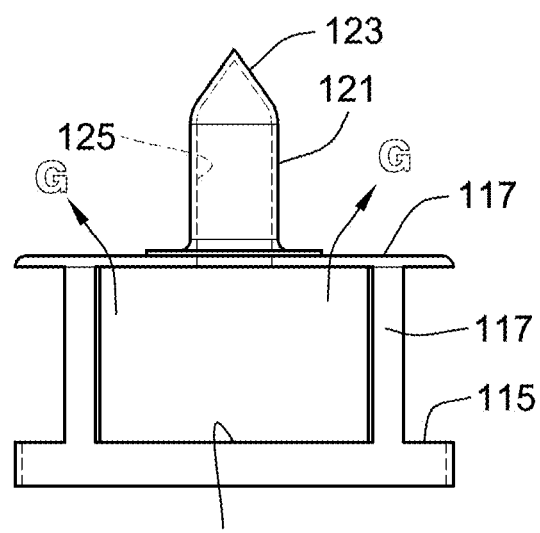
FIG. 6 is a side view of the basket cap portion shown in FIG. 5.
Figure 7:
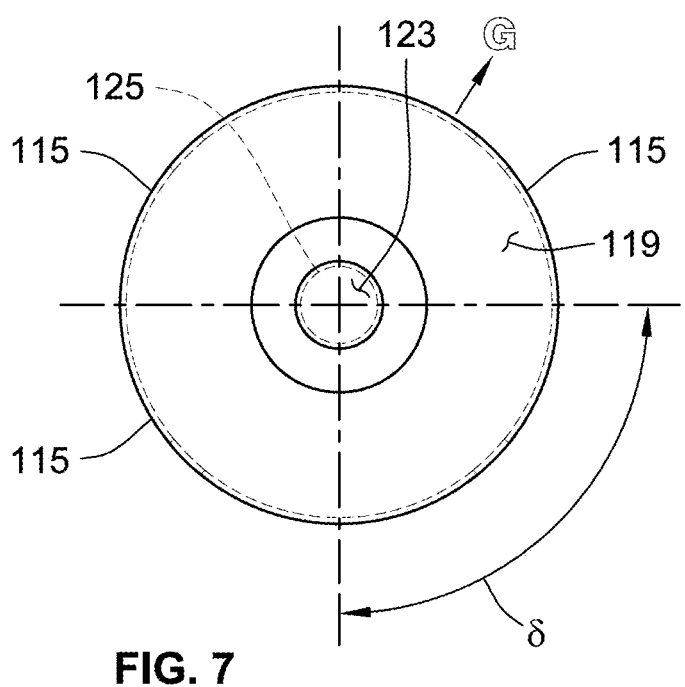
FIG. 7 is an axial end view of the basket cap portion shown in FIG. 5.
Figure 5A:
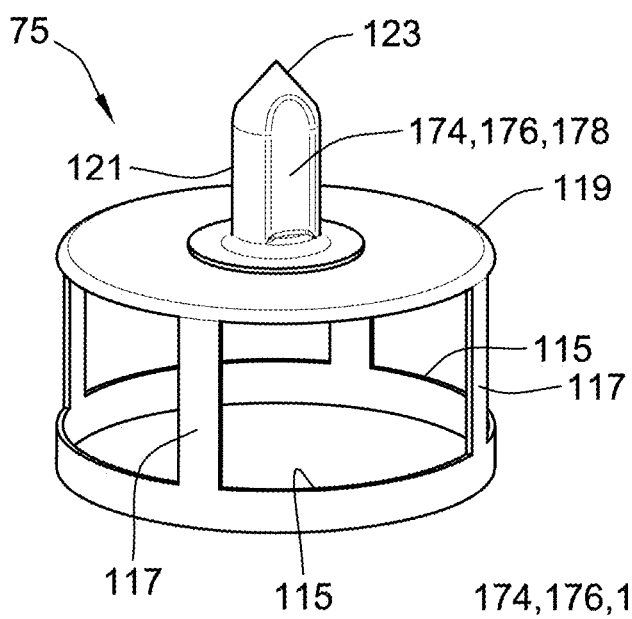
FIGS. 5a, 6a and 7a are similar figures to those shown in FIGS. 5, 6 and 7 respectively, but showing an alternative embodiment incorporating an additional key system.
Figure 6A:
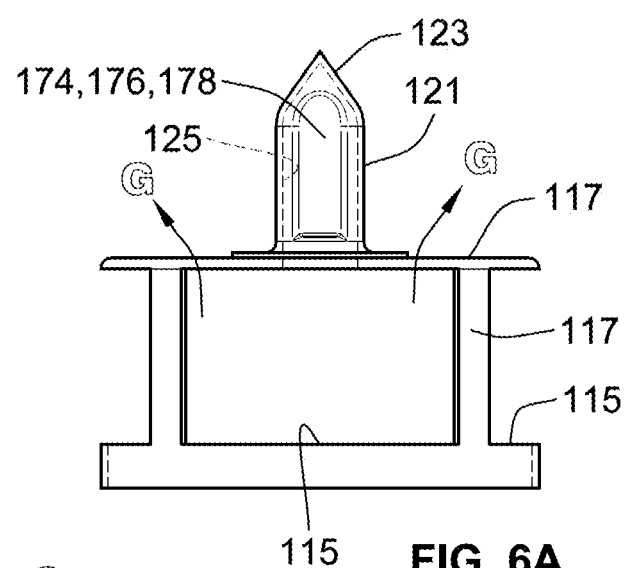
Figure 7A:
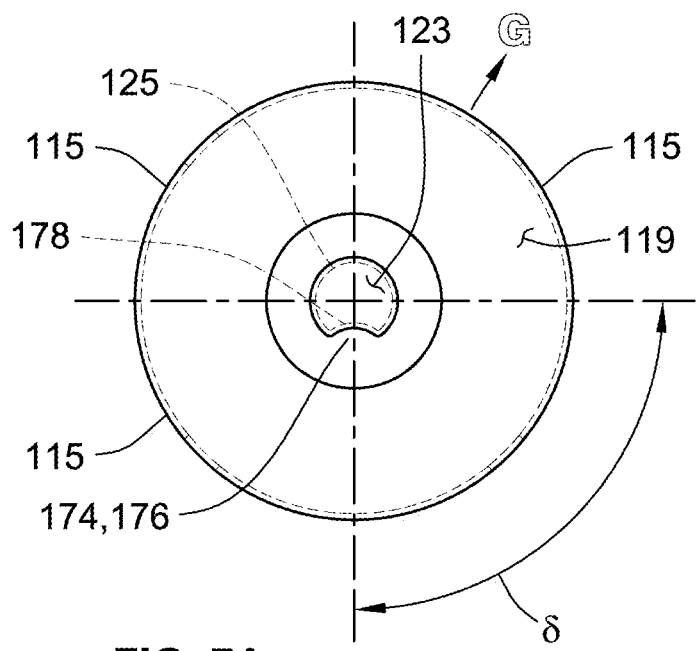
Figure 10:
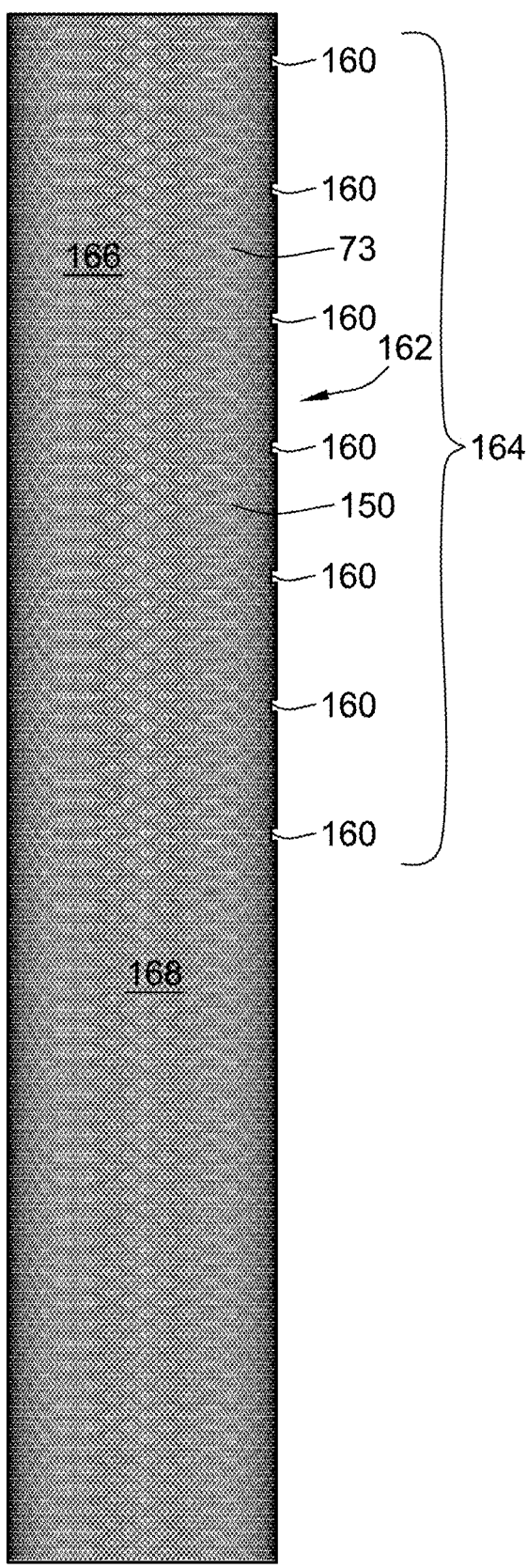
FIG. 10 is a side elevation view of the tubular extension employing drainage apertures, which may be in the form of slots that are sized larger than the pores, the tubular extension being used in the tubular baffle according to the embodiment of FIG. 8.

Referring now to FIG. 5 in the drawings, basket cap portion 75 of tubular baffle 71 is illustrated in a perspective view. Basket cap portion 75 is generally cup-shaped with a plurality of longitudinal windows 115 spatially arranged around a cylindrical cup wall 117, and which terminate at a plate provided by a flat cup lid 119. A hollow basket cap portion post 121, concentric with cup wall 117 protrudes axially away from cup lid 119. Basket cap portion post terminates at a tapered end 123. Basket cap portion post 123 has a central cavity 125 extending through the plate or lid 119 that is configured to matingly receive filter outlet cap post 93b, when separator/coalescer filter element 18 is inserted into tubular baffle 71 (see FIG. 1).

Referring back to FIG. 1, and especially FIGS. 8, 9, 10 and 11 in accordance with certain aspects and in one embodiment, the tubular baffle 71 and specifically the tubular extension 73 is shown to include a perforated sheet metal wrap 150 that is free of and does not include louvers, but instead includes perforated pores 152 that are preferably round in one embodiment. Such pores can be punched out in press operations. The sheet metal wrap 150 is formed into a tubular shape and preferably cylindrical and thereby includes opposed ends including an open inlet end 154 and an open outlet end. The open outlet end may be welded or otherwise secured to the rest of the cap portion 75 whereby a large flow windows and openings are provided to facilitate fluid flow.

The perforations can better ensure evenness of the radial flow through the filter element, and/or control the fluid flow and liquid drainage in such a two stage type vessel. In particular, in one embodiment, the first half of the second stage filter media and collection chamber accounts for between about 50-70% of the gas stream exiting through the first half of the second stage filter media, while 30-50% of the gas stream exits the filter media and collections chamber in the second half of the filters second stage. With pores, an intermediate pressure chamber 158 in the form of a cylindrical chamber in one embodiment is formed radially between the outer periphery of the filter element 18 and the inner periphery of the tubular baffle 71. This can provide a backpressure to encourage use of the entire downstream second stage portion of the filter element reducing flow velocity and more controlled axial flow velocity through the baffle.

To achieve the more even flux and benefits and prevent virtually all of the fluid flow from flowing out say the first 3-6 inches of the second stage filter media segment, the pore sizes are tightly controlled, but yet more open than what is provided in the previous louvered baffle situation. Specifically, the porosity of the non-louvered perforated extension is between ("between" meaning including the end ranges) 20% and 40%, and more preferably between 28% and 35%. This porosity measure does not include drain apertures such as slots, which are discussed with association to additional embodiments.

Further, the pores 152 can be smaller in size than louvers as per the prior art, with pore size preferably being between 0.002 and 0.5 square inches in flow area. Preferably, the pores are punched out as round pores having a diameter between 0.05 and 0.2 inch in diameter.

Additionally, or alternatively, drainage apertures 160 are provided along a gravitational bottom 162 of the tubular extension 73. The drainage apertures 160 work in synergy with the pores 152 to facilitate drainage due to the fact that an axial flow of gas and liquids moves axially along the intermediate pressure chamber 158 driving liquids toward the windows or open end proximate the basket cap portion 75. The drain apertures 160 are large enough to facilitate drainage of liquid that is coalesced prior to reaching the end to prevent such liquids from being re-entrained or atomised due to gas flow velocity through the intermediate pressure chamber 158.

The drainage apertures are different than and larger in flow area than individual ones of the pores 152. Further, the drain apertures 160 may intersect (i.e. larger than the spaces between pore) and thereby connect with different ones of the pores 152.

The drainage apertures are located along the gravitational bottom 162 as liquids drains down through gravity or otherwise and are thus located where drainage can be maximized. However, the drainage apertures are not so large as to create unevenness in the flow through the tubular baffle and ensure that the full length of the second stage portion of the filter element 18 is utilized with the goal of maintaining about even radial flow outward from the filter media along the entire length of the filter element in the second stage. The drainage apertures may each have a flow area of between 0.04 and 0.4 square inches, more preferably between. 1 and 0.4 square inches.

In one embodiment, the drainage apertures comprise a plurality of drain slots that are arranged in a series 164 and axial spaced relation.

Further, tubular baffle may confine the drainage apertures to a downstream portion of the tubular extension 73 to keep higher backpressure at the upstream region and/or for structural integrity to drain liquids where most needed. The downstream portion 166 being shown for example in FIGS. 10, 11 and 16. Further, an upstream portion 168 of the tubular extension 73 is provided that may be free of drainage apertures, with the upstream portion being at least ⅕ the length of the extension. In one embodiment, by restricting the drainage apertures to the downstream portion, this enables liquid to coalesce further along the upstream portion and also maintain their back pressure towards the upstream portion to ensure that more flow through the filter element occurs over the entire length more evenly.

In one embodiment, the drainage apertures are slots that have a length of between 1-4 inches and a width between ⅛ and ½ inches. The slots may extend longitudinally axially, but preferably for strength purposes, the length of each slot extends circumferentially as shown with the width of the drainage slot extending axially. This also allows a greater span of the gravitational bottom. While slots are shown, and are advantageous, other shapes of drainage apertures may be used including simply larger pore openings that are sized substantially larger than those of the pores 152. Again, these would be provided preferably along the gravitational bottom, although some along or around other region are also envisioned.

Additionally, in an embodiment, the drainage slots are spaced axially in the series 164 at least 1 inch apart and more preferably, between 2 and 6 inches apart. This maintains sufficient strength and also maintains sufficient back pressure within the intermediate pressure chamber 158.

Typically, the tubular extension will have a diameter of between 3 inches and 8 inches and a length of at least 1½ feet and typically between 2-4 feet for most embodiments, to provide reference relative to the pore size and drainage aperture arrangements discussed above.

It should be noted that the pores 152 and the drainage apertures 160 may be used in different embodiments independent of each other or in an embodiment combined as shown for example in FIG. 1 and FIGS. 8-11. For example, the slots or other drainage apertures may be added to previous systems such as those shown in U.S. Pat. No. 6,168,674 to Perry Jr. employing a louvered opening arrangement in a baffle, according to one embodiment of the present invention.

While the porosity of the tubular extension is more limited, it is noted that the open end 156 of the tubular extension is not so limited, but opens into the windows formed within the basket cap portion 75 to prevent undue restriction at the far most outlet end of the baffle and filter element so that high flow rates can be ensured as opposed to restricted. The porosity through the windows of the basket cap portion 75 is at least twice as large as the porosity of the tubular extension, and typically at least 85%.

It is also noted that the normal pore size 152 may be between 0.0625 inch in diameter to 0.2 inch in diameter. Drainage aperture 160 would be larger than the pores and in a range of between 0.2 inch and 0.5 inch in diameter, if round.

To orient the gravitational bottom 162 or otherwise to provide for correct compatibility to ensure that the proper baffle is being used or that the proper filter element is being employed, a keying system may be employed. The keying system is shown for example in FIGS. 17-22 and also in FIGS. 5a-7a as well as FIGS. 2d and 2e as it relates to the filter element.

As shown, the apertures 68 in the downstream support grid with straps 67 may include a key 170 in the form of a projecting tab 172 that projects radially inward from the otherwise circular surface of the apertures 68. Inlet grid 65 may or may not have a similar key system that keys with inlet/first stage end caps of the filter element. Also, the tubular baffle 71 along the post 121 may include formed therein a key 174 that is complimentary to key 170. This key 174 may take the form of an annular groove 176 along the outer periphery that extends axially along the post 121 and through the tapered end 123. Additionally, internally, the annular groove 176 becomes a projecting rib 178 that extends axially along the internal cavity 125 of the post 121 such that the key 174 may be provided on one or both the outer periphery surface and inner periphery surface. The key may also be alternatively formed on a different portion of the tubular baffle such as along the plate or cup lid 119, along the cup wall 117 or other such portion. See FIG. 2e as an example with keys 194.

The filter element also includes a complimentary key 180 that mates with the key 174 of the baffle. Key 180 may be formed along the outlet side of post 93b, and may take the form of a groove 182 that extends axially and through the tapered end in one embodiment.

Each of these keys are arranged at a predetermined orientation relative to the tubular extension 73 and particularly the drainage apertures 160 and gravitational bottom 162 of the tubular extension. Specifically, the keys 170, 174 and 180 are all provided to orient and arrange the drainage slots and at the gravitational bottom during use to facilitate such drainage.

While the projection and groove structure is particularly beneficial and provide for a detent structure to rotationally lock each of the keys 170, 174 and 180 to prevent relative rotation between the tubular baffle and the vessel and prevent relative rotation relative to the filter element and the tubular baffle and/or for compatibility, other such key structures and orientation devices are also contemplated. For example, other detent structures may be employed. In one embodiment, and as shown in FIG. 2e, it may comprise a flat 184 form along the post and/or tabs 186 that are formed at a predetermined angular orientation relative to the post along the end caps of the filter elements. Rather than being tabs, receptacles may alternatively be used along the end caps that would be received or mate with corresponding tabs projecting axially from either the support grids of the vessel and/or the basket cap portion 75 of the tubular baffle 71. Such a keying system may be used additionally for filtration media characteristics to ensure that the proper elements are being in the right or correct vessels. Different filter media grades may be used or different efficiencies needed in different applications for such GEMINI vessels and such a keying system can be used to provide those features.

In the particular arrangement, it has the additional advantage of assisting in installation in that the filter element may be rotationally locked to the tubular baffle and installed together during axial installation to push the tubular baffle 71 into engagement and keying relationship with the support grid 68 and the keyed aperture 68 shown in FIG. 17.

Because the installation is done at the other opposite end, the orientation device may additionally or alternatively include in one embodiment a directional symbol 188 formed upon the inlet end cap 91a such as an arrow pointing up when oriented correctly. This may be part of the post projection shaped in this format to include a triangular post 190 and a vertical flange 192 vertically below the triangular post. This structure itself may serve as a key 194 and mate with a corresponding keyed aperture receptacle in the inlet support grid straps 65 and openings 66. The advantage of the directional arrow is that it shows the installation which way is up as the installation is largely done blind and the installer can then see which way the filter element needs to be installed to be properly received without difficult into the tubular baffle 71. Specifically, with reference to FIG. 1 it can be seen that the closure is only at the inlet end and at the other end through the partition wall the outlet side of where the keying structures are provided cannot readily be seen during installation. By providing a directional indication, this assists the service technician in finding the correct keying location. Alternatively, the service technician could operate without such a directional indication by rotating until the corresponding keys are found to facilitate rotational locking and installation.

Additionally, with reference to FIGS. 2a-2d, various embodiments are shown, some of which may benefit from employing a keying structure to facilitate proper orientation of the filter element to arrange a treated region at a predetermined angular orientation with a certain portion of the outer cylindrical periphery of the filter media being located at a gravitational bottom. As mentioned above, the keying system may also be used to simply indicate whether a certain type of filter media or treated filter media may be installed or used and/or to orient the baffle. Any of the keying systems described above may be used in conjunction with these embodiments. Alternatively, it is also possible that the treated media embodiments discussed in FIGS. 2a-2d may also be used along without such keying systems even though synergy exists using those systems together.

Turning then to FIGS. 2a-2d, there is shown a filter element 18a-18d, each of which includes a treated region 200a-200d, and an untreated region 202a-202d. The treated region provides a filtration characteristic that is different than the untreated region. Specifically, the treated region and untreated regions may be along different outer peripheral regions of the filter element. In one embodiment, the treated region has a surface energy that is different than the untreated region with an increased wettability for hydrocarbons. This may be done by way of a fluorocarbon treatment such as plasma fluorination or other chemical additives or coatings along the treated region. The untreated region, however, does not receive such treatment coatings or the like. The untreated region may have greater flow therefore, in some embodiments or a greater porosity. For example, the treated and untreated regions may also include some masking or additional media applied over a certain region.

Figure 2A:
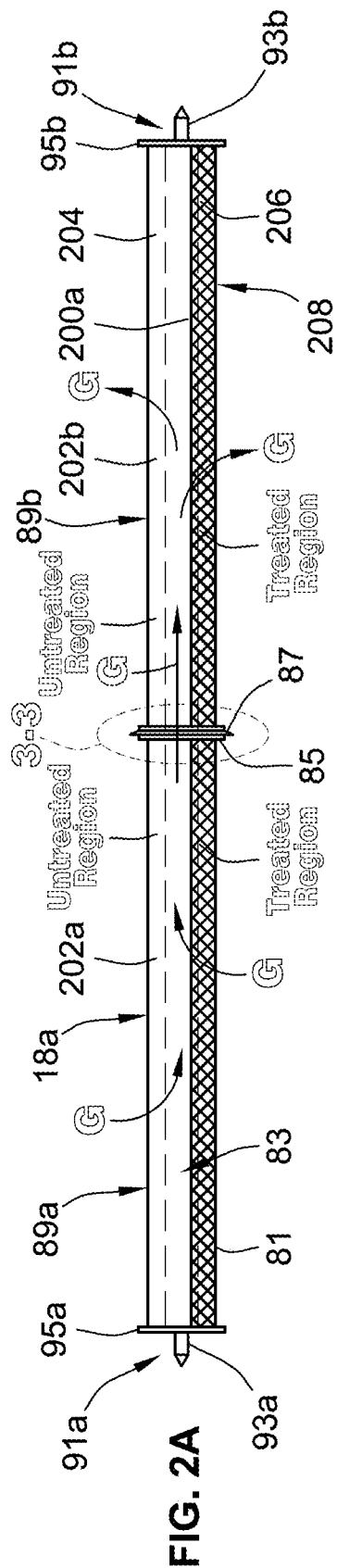
FIGS. 2a, 2b, and 2c are similar views to FIG. 2 showing a side elevation view of a separator/coalescer filter element of FIG. 1 according to additional embodiments of the present invention, with FIG. 2a showing an embodiment where the filter media of the filter element includes a treated region on a lower horizontal half and an untreated region on an upper horizontal half of the filter element.

In the embodiment shown in FIG. 2a, there is provided a filter element 18a that comprises filter media extending horizontally along the axis to include an upper half 204 and a lower half 206. As shown, the bottom half comprises the treated region 200a. The lower half may also partially incorporate part of the treated region 200a in some embodiments. Preferably, the upper half 204 comprises only the untreated region 202a and does not comprise any portion of the treated region. Preferably, at least half of the upper half is free of such treated region. With this arrangement, the wettability and flow of liquids along the gravitational bottom 208 is enabled or provided. The increased wettability for hydrocarbons facilitates additional flow of liquid through the filter element at these regions. Further, an orientation device such as those previously described including keys for example, may be employed and arranged at predetermined angular orientations to locate the gravitational bottom 208 of the filter element 18a at the appropriate gravitational bottom location when installed in the filtration vessel and in use.

Figure 2B:
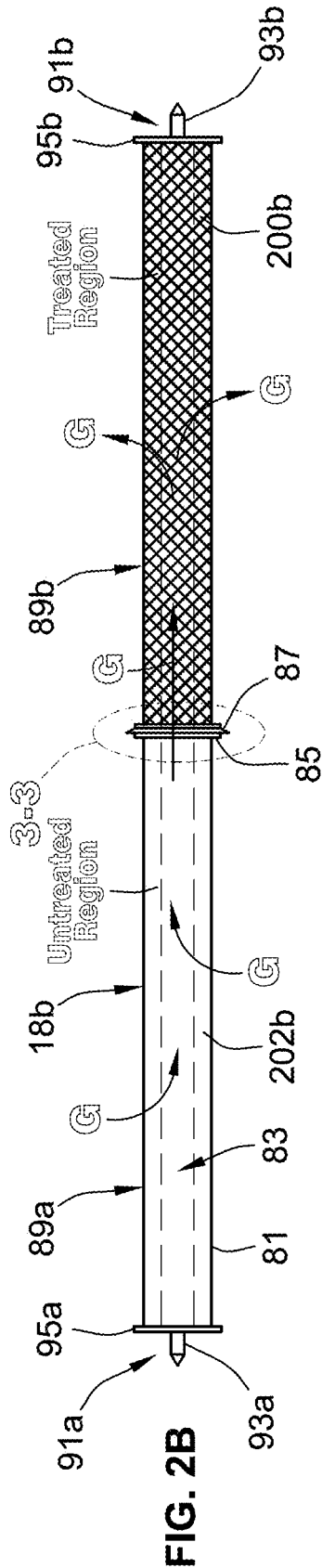

In the embodiment shown in FIG. 2b, filter element 18b instead includes a treated region 200b over the entire second stage 89b of the filter element downstream of the seal 87. In contrast, the upstream region along the first stage 89a may be untreated and form the untreated region 202b in whole or in part. The treated region 202b may extend partially into the first stage 89a in this filter element 18b. This is particularly advantageous when employing a unitary tube for the filter media that extends over both first and second stages 89a and 89b whereby the first and second stages are identical but for the additional treatment being formed along the second stage.

Figure 2C:
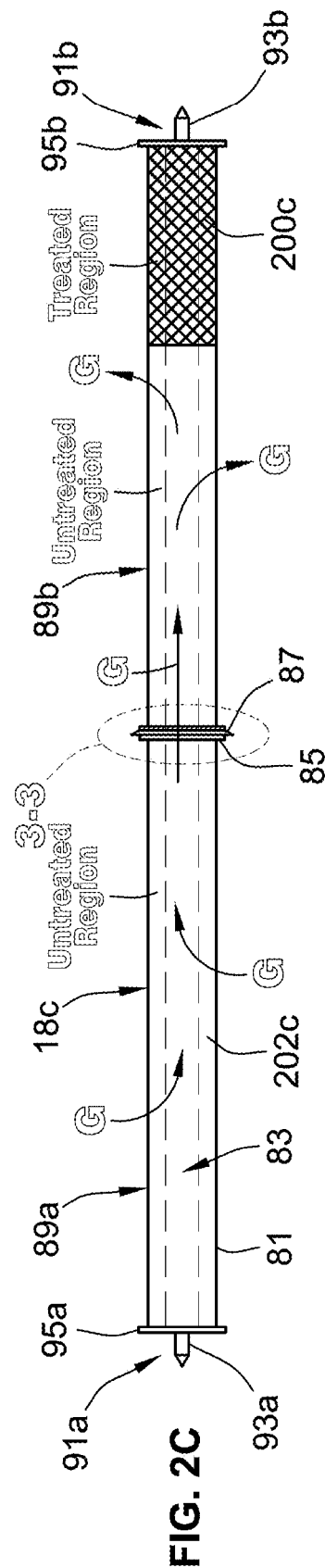

Turning then to FIG. 2c, a further embodiment is shown where a filter element 18c includes a treated region 200c restricted or confined only to an axial end portion of the second stage 89b. The second stage 89b also includes an upstream portion or other axial end portion comprising the untreated region 202c. The untreated region 202c may also extend over the first stage 89a in the filter element 18c. In this embodiment, the treated region 200c may also comprise some increased porosity to encourage additional flow toward the end of the filter element to prevent premature exiting of gaseous fluid flow. However, it may also comprise a fluorocarbon treatment to encourage liquid droplet formation at the axial end and closest to the window region 115 of the tubular baffle when employed in use (see other figures).

Figure 2D:
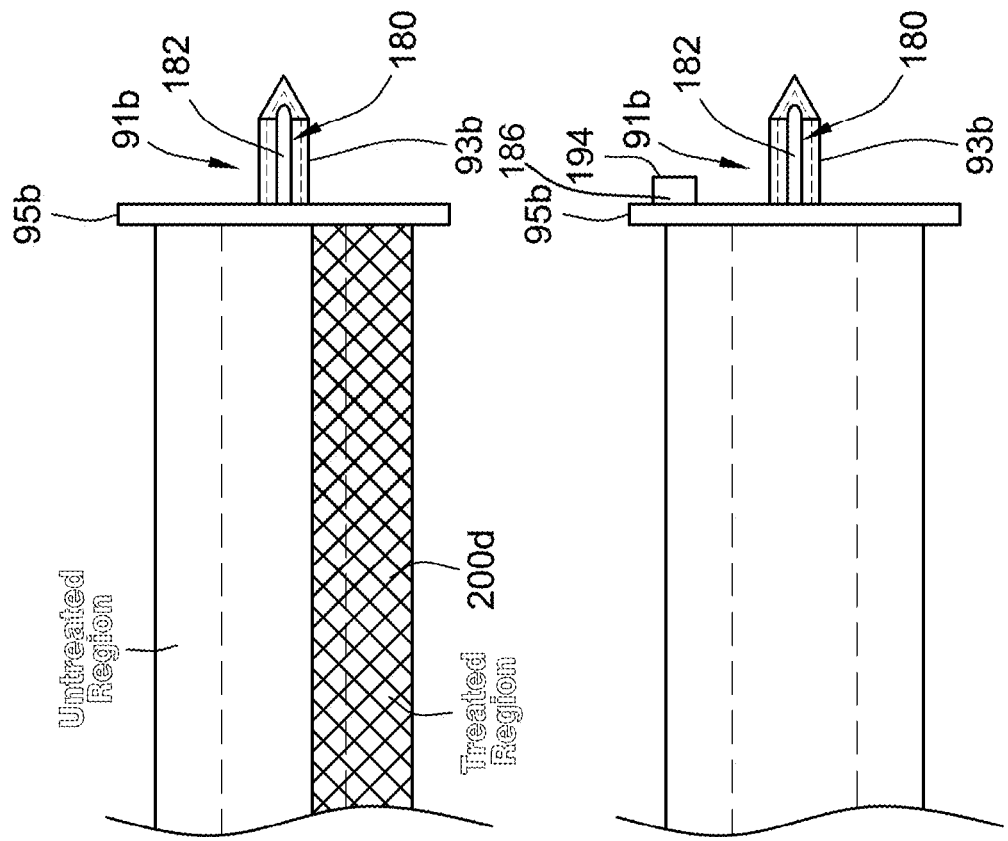
FIGS. 2d and 2e are further side elevation views of additional embodiments of the separator and coalescer filter element shown in FIG. 2, but with additional keying system and a treated region on the second stage and lower half in the filter element of FIG. 2d, and a multiple keying system and alternative different key structures being shown in FIG. 2e.
Figure 2E:
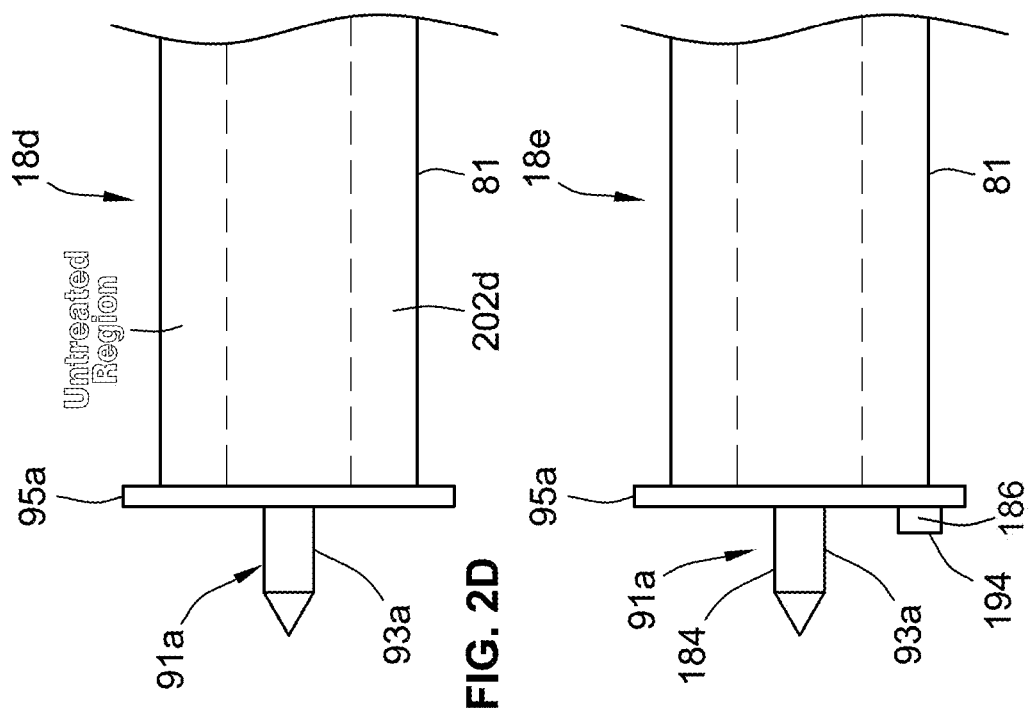

Turning then to FIG. 2*d*, yet a further embodiment showing filter element 18*d* is shown with a treated region 200*d* along the bottom half of the filter element at the gravitational bottom like FIG. 2*a*, but also restricted primarily to the second stage either substantially or confined as in either of FIGS. 2*b* and 2*c*. As shown, the untreated region 220 extends over the first stage in this embodiment. This arrangement and enlarged image also shows the keying system for orientation of gravitational bottom.

From the above description, a recap and summary will be provided additional context relative to the additional coverage sought in this particular continuation-in-part application. From the above description and FIGS. 1-22, it is apparent there is thus provided a filter element 18 configured for use with a particular keyed tubular baffle 71. By configured for use it is meant that the filter element is usable with therewith and will interfit therewith such as in the claims appended hereto. But in such instances a claimed a "filter element configured for use with a tubular baffle" is directed to the filter element (and is not claimed in combination with the tubular baffle), whereas in contrast a claim directed to "a filter and baffle assembly" is directed to such combination by claiming components affirmatively in combination. The particular keyed tubular baffle 71 includes a tubular extension 73 and defines a plurality of pores 152 (that either may be louvered or may not be louvered), with the tubular extension 73 including first and second open ends (e.g. to receive the filter element therethrough as shown in FIG. 16), and with a cap portion 75 coupled to one of the first and second open ends. The cap portion 75 comprises an end plate (see e.g. FIG. 17) with the post 121 projecting from one side that provides a hollow receiver (see e.g. the internal cavity 125 of the post 121), a key projection (e.g. projecting rib 178 and/or groove 178) along the post 121 and projecting radially inwardly in the hollow receiver.

According to an above disclosed embodiment, the filter element 18 comprises: (a) a tubular filter media extension with an internal central flow passage (e.g. the ring of filter media such as provided by the filter wall 81 that may have hollow core 83, and which may be either a continuous single unitary tube or multiple separate elements) having a first stage end provided (e.g. provided by first stage portion 89*a*) and a second stage end (e.g. provided by second stage portion 89*b*), with the second stage end sized to be received within the tubular baffle: (b) a seal 87 disposed along the tubular filter media extension between the first stage end and the second stage end to separate the first filter stage 89*a* and the second stage 89*b*: (c) with the first stage end cap 91*a* closing the first stage end of the tubular ring of filter media: (d) with the second stage end cap 91*b* closing the second stage end of the ring of filter media; and (e) a mounting post 93*b* provided by second stage end cap that is configured to be received within the hollow receiver of the tubular baffle with an axial clearance region arranged to clear the key projection of the tubular baffle.

In an above embodiment, for example, the axial clearance region of the filter element is provided by the key 180 and/or an axially extending groove 182 such as shown in FIG. 17 (see also FIGS. 2D, 2E). As apparent, this structure (e.g. key 180 and/or an axially extending groove 182) also provides means at the second stage end cap 91*b* for clearing the baffle's key projection to allow the filter element to interfit with the keyed tubular baffle. Preferably, the axial clearance region is configured to key with the key projection for providing a predetermined angular orientation for use, with the groove being particularly advantageous. However other embodiments provide the axial clearance region and/or the means at the second stage end cap 91*b* for clearing the baffle's key projection, and are also shown and described in conjunction with alternative embodiments in FIGS. 23-29.

It is understood that the alternative embodiments filter elements of FIGS. 23-29 are identical to the filter element 18 (e.g. same ring of filter media such as provided by the filter wall 81 that may the hollow core 83, and which may be a continuous single unitary tube or multiple separate elements: same seal 87 and seal holder 85), except for an alternatively configured second stage end cap and/or alternatively configured first stage end cap, such that the description above for earlier embodiments is equally applicable to the embodiments of FIGS. 23-29 unless expressly indicated to the contrary.

Figure 11:
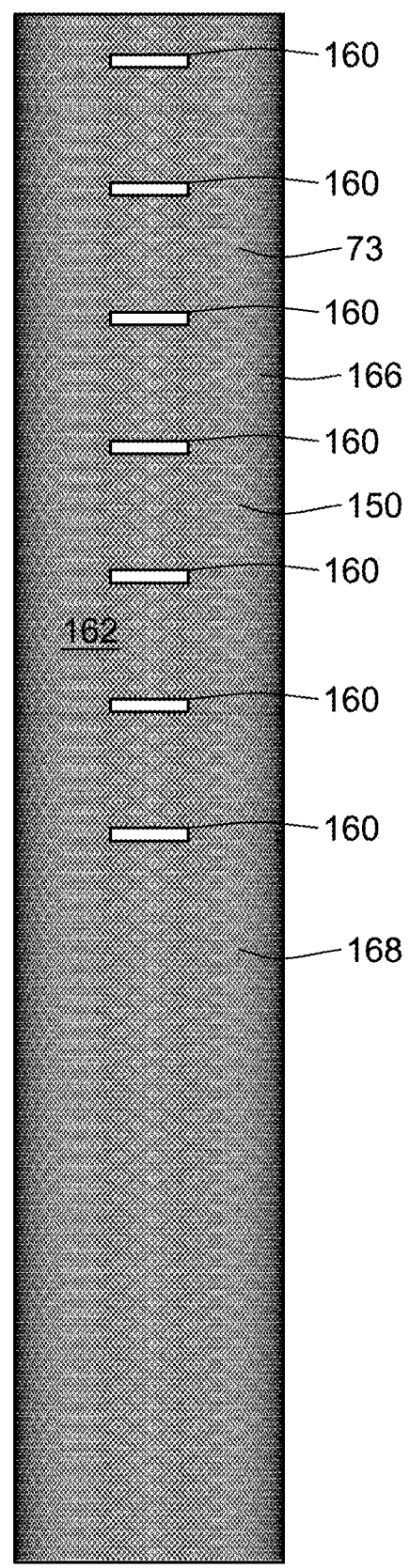
FIG. 11 is a bottom view showing the gravitational bottom of the tubular extension of FIG. 10.
Figure 22:
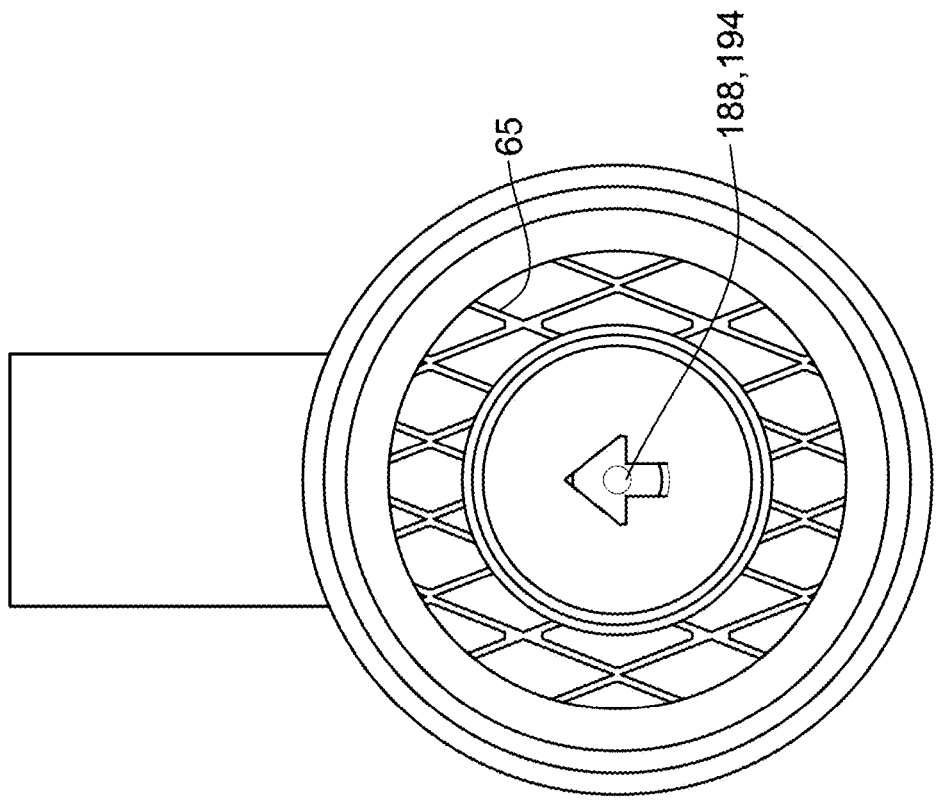
FIGS. 21-22 are opposed partially schematic axial end views taken through cross section of a filtration vessel with a filter element and coalescing tubular baffle employing the keying systems shown in FIGS. 17-20.
Figure 21:
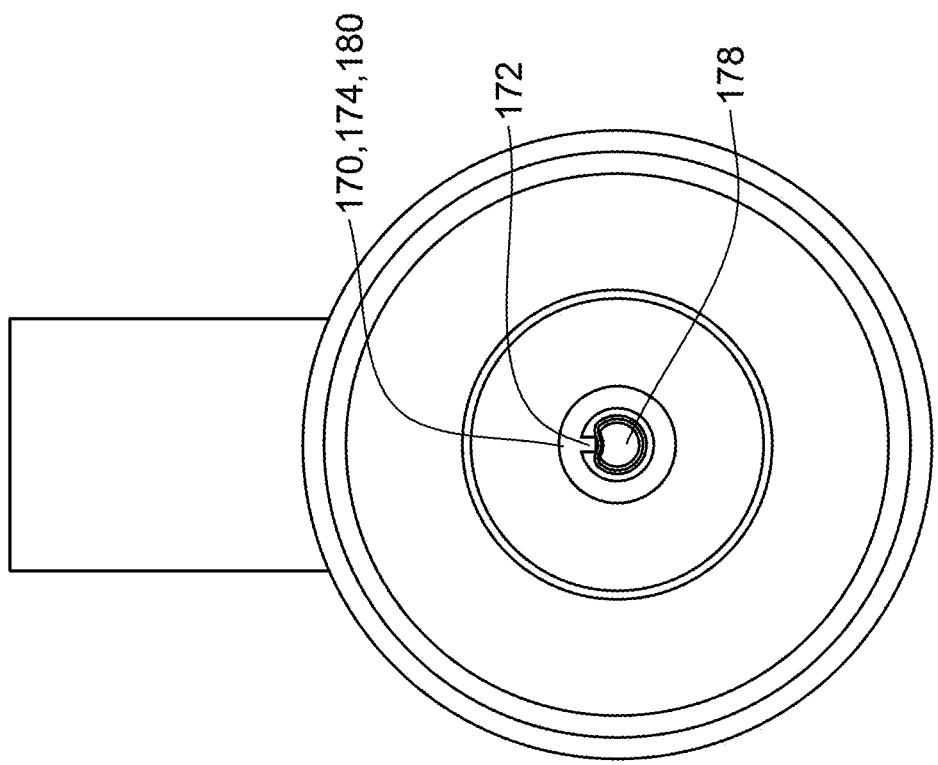
Figure 23:
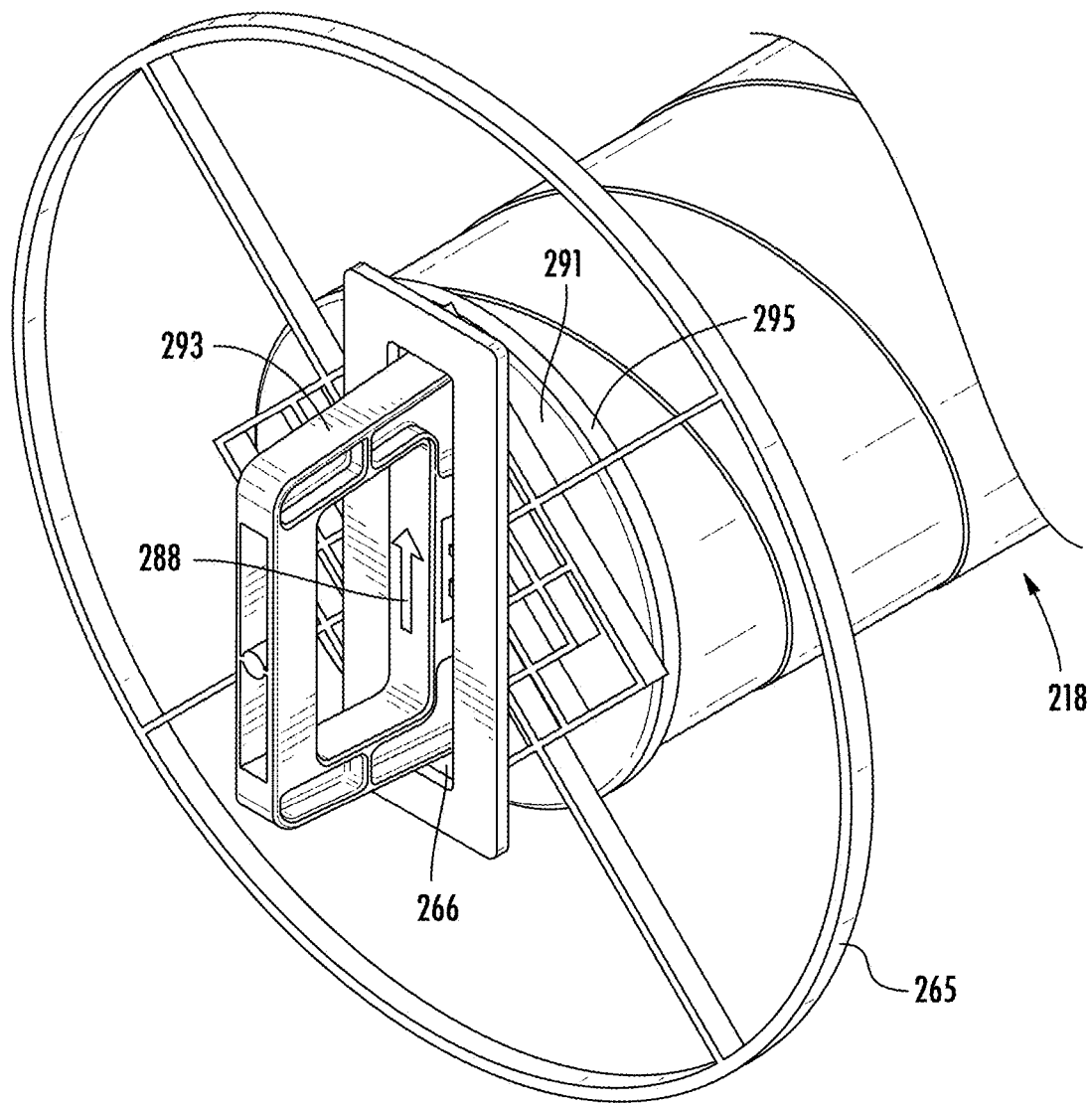
FIGS. 23-25 are isometric view of end portions of a filter element interacting with baffle and vessel components according to an alternative embodiment, with the first stage end portion of the filter element illustrated FIG. 23 and the second stage end portion being illustrated in FIGS. 24-25, which may be used as a retrofit, and which filter element and other components may be substituted or used in place of the corresponding component parts of FIG. 1, according to an embodiment of the present invention.
Figure 24:
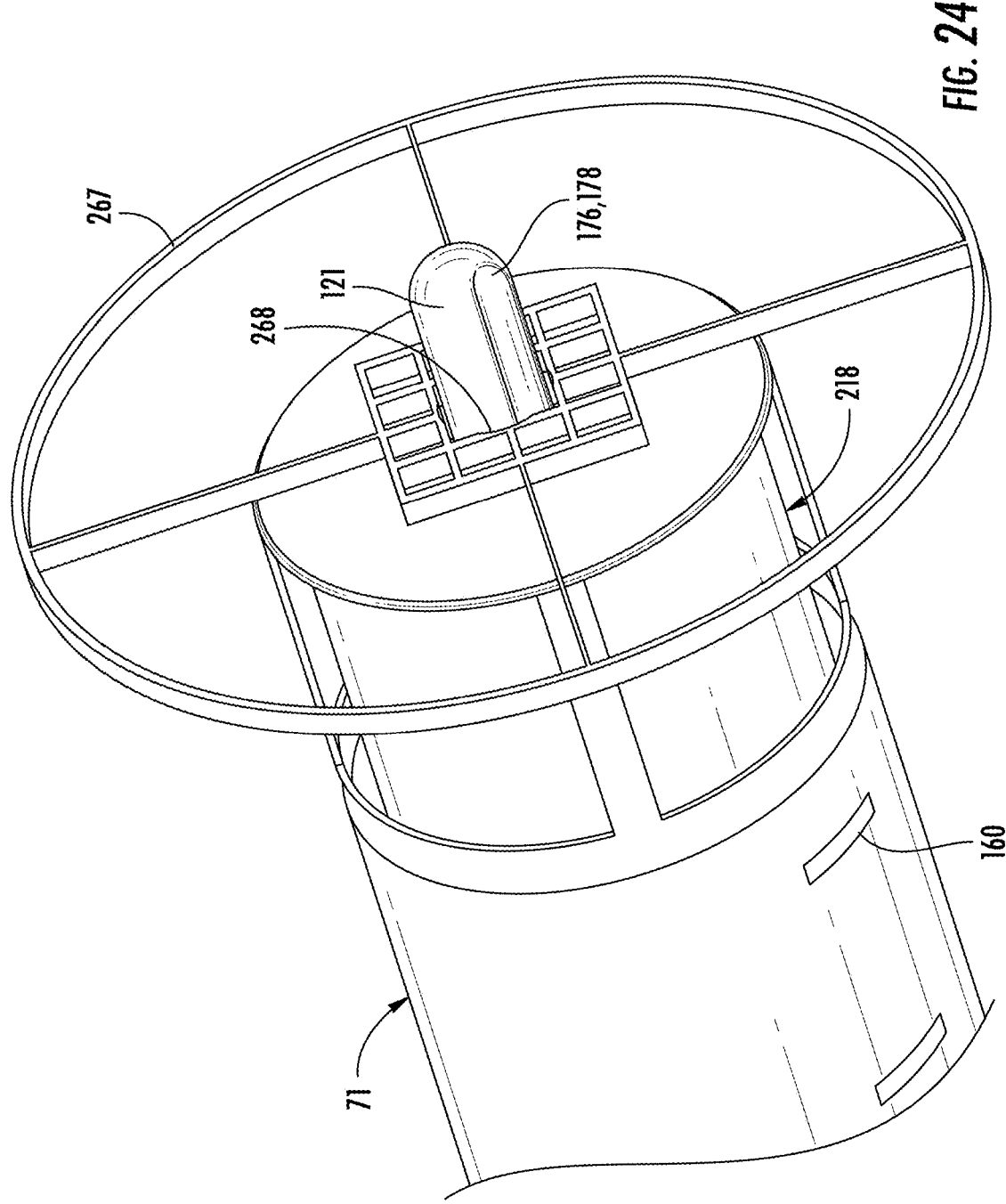
Figure 25:
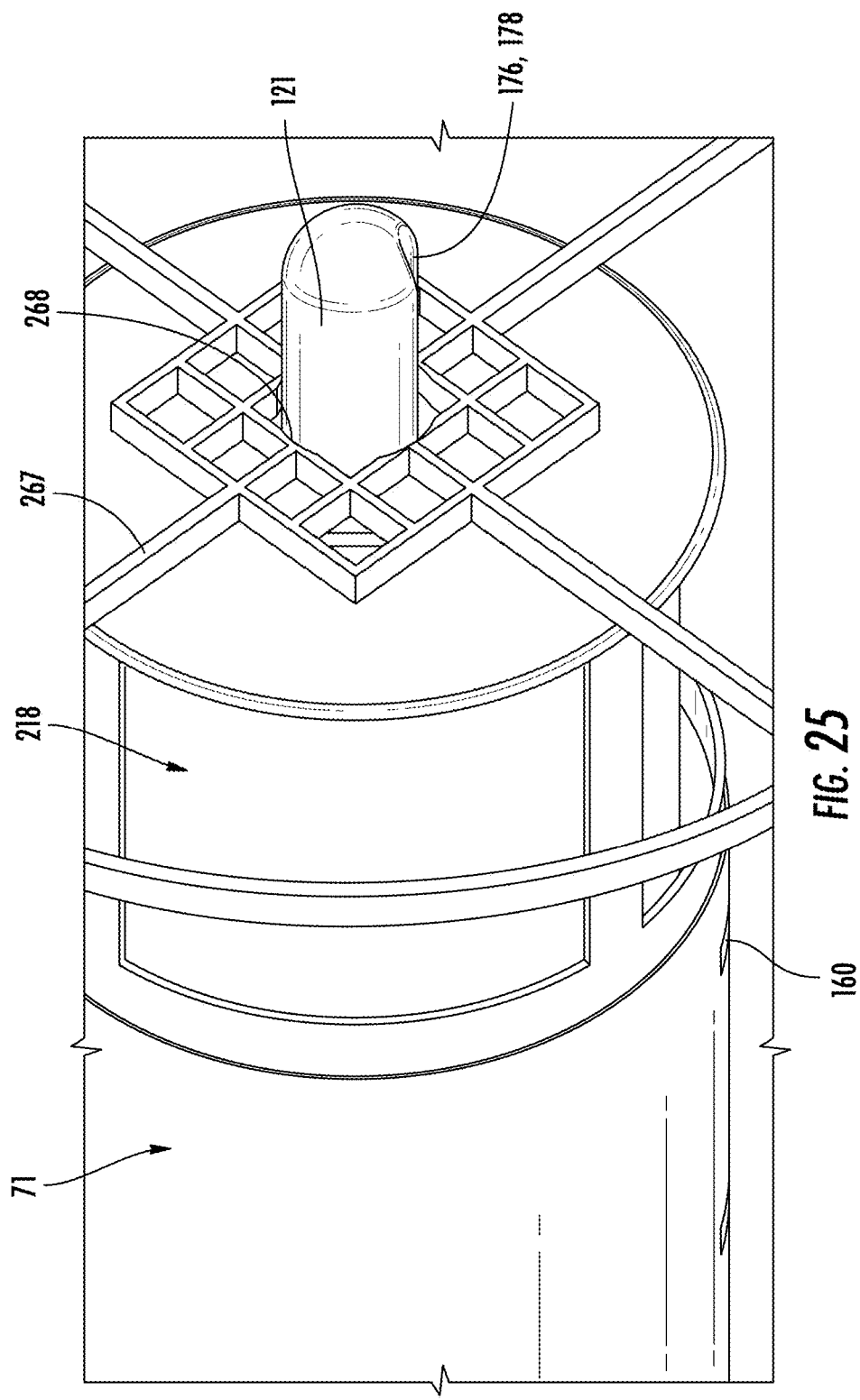

Turning to FIGS. 23-25, in this alternative embodiment, a filter element 218 is illustrated including the same tubular filter media extension with an internal central flow passage much like the earlier embodiment (e.g. see references 81 and 83 in FIG. 2) that is also for use with the same keyed tubular baffle 71 (including drainage apertures 160 are provided along a gravitational bottom 162 of the tubular extension 73—see e.g. FIGS. 1, 11 and 16). The keyed tubular baffle 71 provides the post 121 projecting from one side that provides a hollow receiver (e.g. the internal cavity 125 of the post 121 as shown in earlier figures), and a key projection (e.g. projecting rib 178 and/or groove 176) along the post 121 and projecting radially inwardly in the hollow receiver. The second stage end cap 91*b* (see earlier figures) is the same as the earlier embodiments and as such keys with the keyed tubular baffle 71 such as with key 180 (such as axial groove 182) to provide a predetermined angular orientation between the baffle 71 and the filter element 218 and so that if the filter element is rotated the baffle will also rotate. Rotation is allowed here because the second stage support grid 267 has a keyless aperture 268 which receives the post 121 of the baffle 218. The keyless aperture 268 is thus different that the keyed aperture 68 (having key 170 in the form of projecting tab 172 shown in the earlier embodiment of FIG. 17). In this respect, this allows for a retrofit application in which the improved tubular baffle 71 with drainage apertures 160 may be installed into a keyless pre-existing multiple stage filter element assembly such according to those described an incorporated by reference in the Background Section above. Accordingly, when the keyed tubular baffle 71 is installed with the keyed post 121 into the keyless aperture 268, and unlike the earlier embodiment, in this embodiment the tubular baffle 71 can freely rotate.

However, in this embodiment of FIGS. 23-25, the first stage end cap 291 is different as shown in FIG. 23 and includes an alignment handle 293 that projects axially outward from a flat flange portion 295 of end cap 291. The first stage end cap 291 is similar sealingly bonded to the first stage end of the tubular filter media extension. Further an alignment indicator such as directional symbol 288 may be used. The handle 293 is non-circular and preferably has a longer dimension (than the width) that extends vertically as shown when in the proper position. As such the handle 293 provides an indication of alignment (with optional directional symbol 288). As a result, the filter element 218 employ the key 180 and the handle 293 at opposite ends together provide means for aligning the tubular baffle 71 for a variety of purposes, such as for example to align the drainage apertures 160 at the gravitational bottom to make those function to facilitate gravitational drainage of coalesced liquids from a fluid stream. In particular, in a retrofit application and when the keyed tubular baffle 71 is installed with the keyed post 121 into the keyless aperture 268, the handle 293 can be rotated which in turn rotates the baffle 71 which is rotationally locked thereto by keying so that the drainage apertures 160 can be aligned manually at the gravitational bottom to facilitate gravitational drainage. Preferably, the angular orientation is such that when the handle is aligned in predetermined alignment such as vertical as such (and as may be indicated by the directional symbol 288), the drainage apertures 160 are aligned at the gravitational bottom. Further, a removable and installable inlet support grid 265 in this embodiment may also be modified relative to that of FIG. 1 (and replaced in retrofit applications), in that the aperture 266 is non-circular in this embodiment such as shown as a vertical slot that closely receives and aligns the handle 293 at the correct position such as vertically in this embodiment and that thereby locks the angular alignment when engaged and installed with the inlet grid 265. As such, the inlet support grid 265 can be new and retrofitted to replace conventional inlet grids having circular apertures or if otherwise do not provide for correct alignment.

Turning next to FIGS. 26-29, these disclose alternative embodiments of the post structure of the second stage end cap that also provide for inter-fitting with the keyed tubular baffle. Other than the filter element second stage end cap post configuration, these embodiments can be identical to the earlier described embodiments (including any of the embodiments of FIGS. 1-25), such that the disclosure of FIGS. 1-25 are thereby fully applicable and vice versa to these embodiments other than for the distinctions noted on the post configuration.

Figure 26:
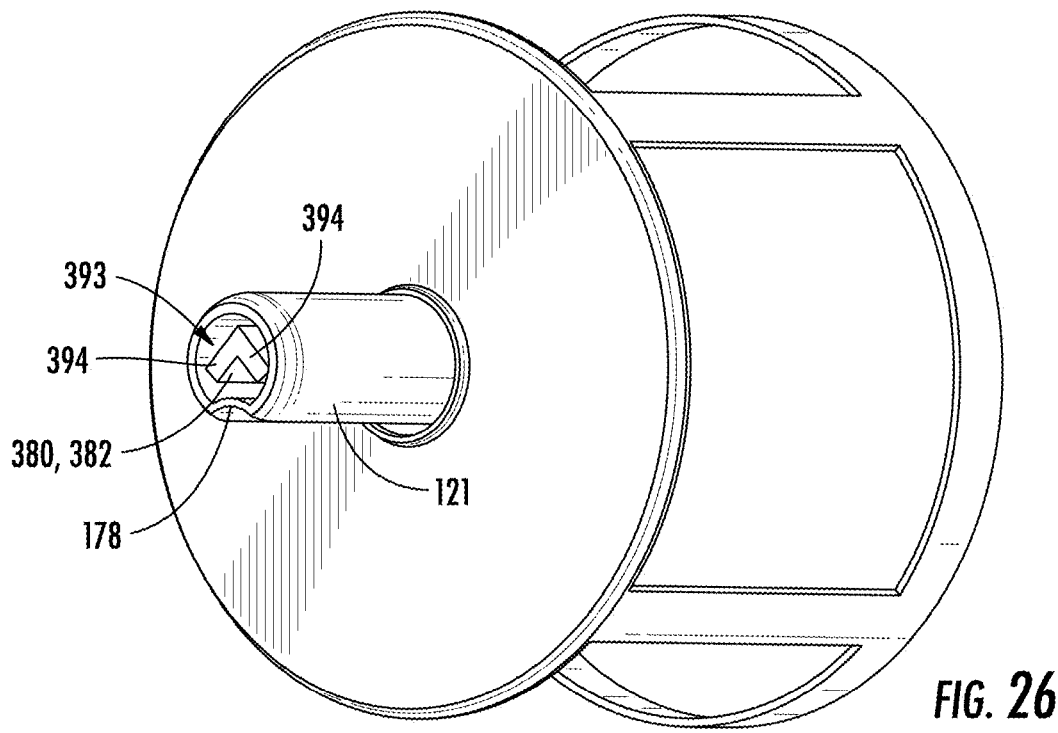
FIG. 26, is an isometric view of an alternative embodiment of a post having instead a chevron-shape for the second stage end cap of the filter element to be substituted for the filter element end cap post shown in FIG. 17 (see also FIGS. 2d and 2e) that similarly provides an axial clearance region arranged to clear the key projection of the keyed tubular baffle tubular baffle as illustrated and that may also provide a keying structure depending upon post configuration.
Figure 27:
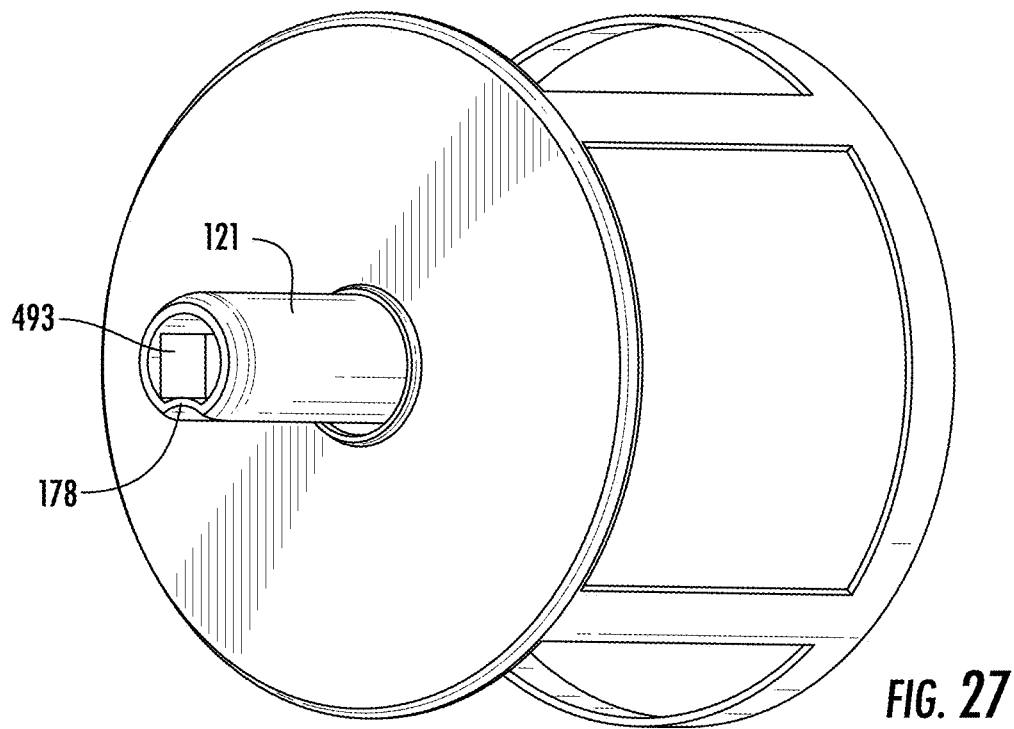
FIG. 27 is an isometric view of yet another alternative embodiment of a post having a rectangular shape for the second stage end cap of the filter element to be substituted for the filter element end cap post shown in FIG. 17 (see also FIGS. 2d and 2e) that also provides at least an axial clearance region arranged to clear the key projection of the keyed tubular baffle tubular baffle as illustrated and that may also provide a keying structure depending upon post configuration.

Referring to FIGS. 26 and 27, the mounting post can have a non-circular configuration comprising at least one of polygonal shape, rectangular shape and chevron shape. For example, FIG. 26 provides an alternative embodiment of a post 393 of the second stage end cap that has a chevron shape, including a pair of wings 394 that together define an axially extending V-shaped groove 382 that can provide a key structure 380. The chevron shaped post 393 can interfit with and provides clearance to receive the key and rib 178 the keyed tubular baffle when received into the corresponding hollow receiver of the baffle post 121. Preferably, the chevron shaped post 393 is sized large enough to only fit one way into the receiver of the baffle post 121, and as such may be used for providing for a predetermined rotational orientation between the filter element and the keyed tubular baffle. To provide strength considering the smaller dimension, the post 393 and/or the second stage end cap may be made of steel or other stronger material including reinforced materials than conventional plastic employed in the second stage end cap in more typical application. FIG. 27 shows an alternative embodiment of a post 493 of the second stage end cap that has a rectangular shape, which is sized small enough to provide clearance for the key and rib 178 of the keyed tubular baffle when received into the corresponding hollow receiver of the baffle post 121. Further, it the rectangular post 493 is not square and is wider in one dimension, the post 493 may only fit within the keyed tubular baffle in only one of two orientations, right side up or upside down. If used in conjunction with directional indicia 288 at the first stage (see e.g. FIG. 23), this can also provide for predetermined orientation between the tubular baffle and the filter element.

It may also be asymmetrical relative to the central axis of the filter element at least along portion.

Figure 28:
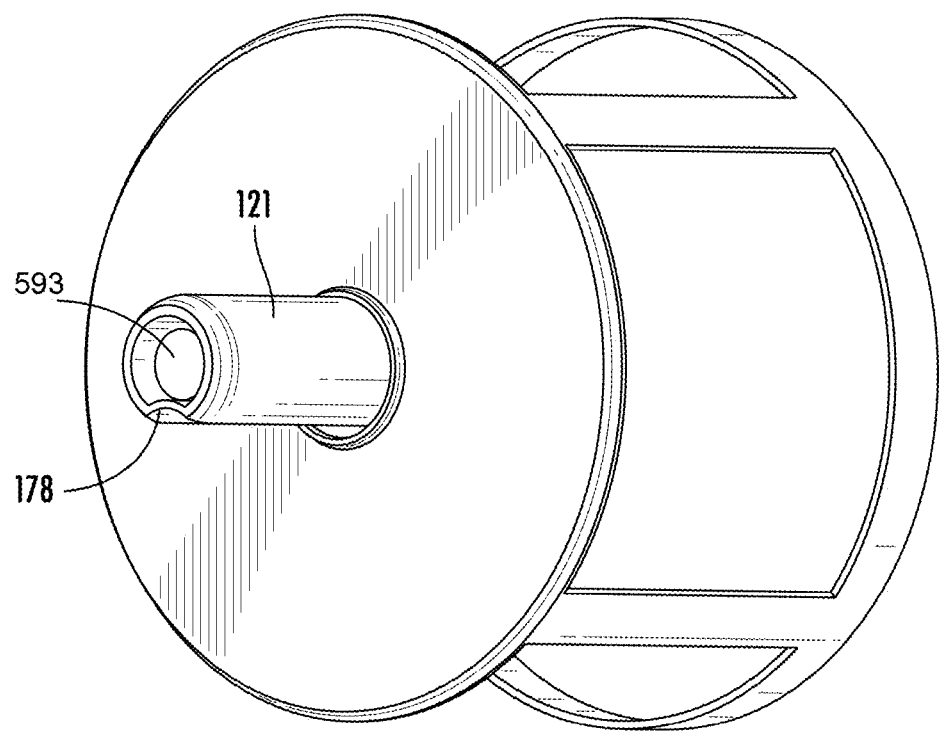
FIG. 28 is an isometric view of yet another alternative embodiment of a post having a reduced diameter for the second stage end cap of the filter element to be substituted for the filter element end cap post shown in FIG. 17 (see also FIGS. 2d and 2e) that provides at least an axial clearance region arranged to clear the key projection of the keyed tubular baffle tubular baffle as illustrated, but this embodiment does not provide keying.

Another embodiment is illustrated in FIG. 28, in which a circular but smaller post 593 is used that has a reduced diameter for the second stage end cap. Nevertheless, this post is configured to be received within the hollow receiver with an axial clearance region arranged to clear the key projection, and thereby provides for compatibility, although it is less preferred in that this embodiment does not provide keying.

As apparent from FIGS. 26-28 embodiments, these alternative posts 393, 493 and 593 also provides means at the second stage end cap 91*b* for clearing the baffle's key projection to allow the filter element to interfit with the keyed tubular baffle. Preferably, the axial clearance region is configured to key with the key projection for providing a predetermined angular orientation for use as in the FIGS. 26 and 27 embodiments, with a less preferred embodiment having a smaller diameter circular post 593 that merely provides clearance only for interfitting but no predetermined orientation feature in the post 593 unlike other embodiments.

Figure 29:
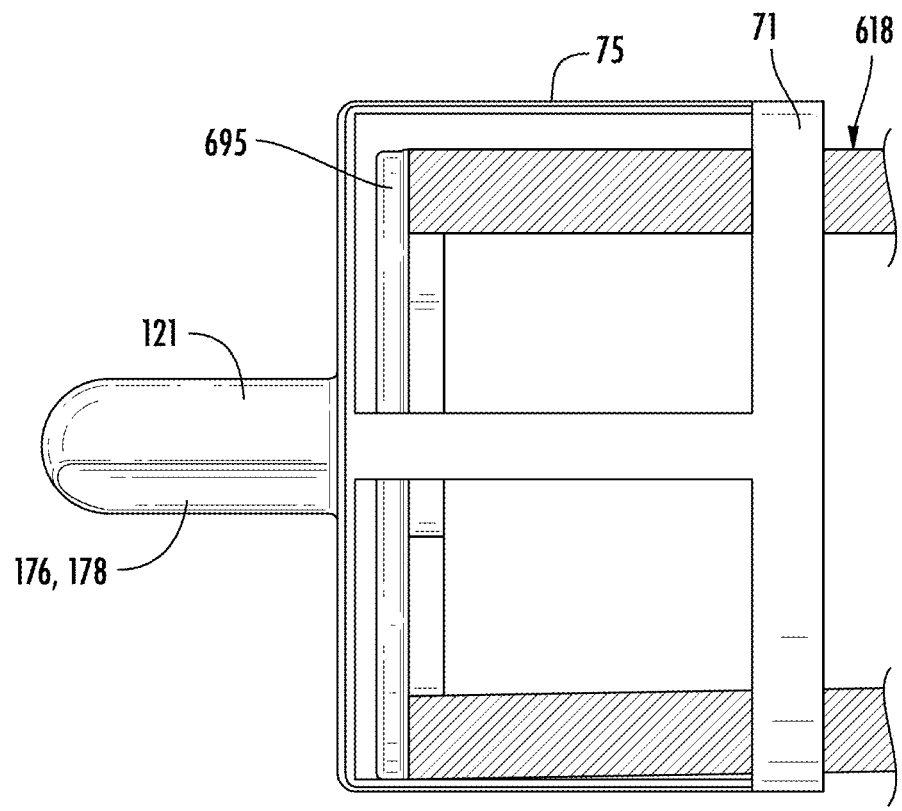
FIG. 29 is an side view of the second stage end portion of a filter element, that may be used with the key tubular baffle as disclosed in other figures according to yet another alternative embodiment with the filter media tube being illustrated in cross-section and pored tubular extension removed for better illustration, with the second stage filter element end cap being postless so that the second stage of the filter element may rest on the keyed tubular baffle along the bottom as is illustrated, in which the postless filter element end cap provides for clearing the baffle key projection to allow the filter element to still interfit with the keyed tubular baffle.

Turning next to FIG. 29, an alternative embodiment of a filter element 618 having second stage filter element end cap 695 is illustrated being postless so that the second stage end portion of the filter element may rest on the keyed tubular baffle along the bottom as illustrated such as along cap portion 75 of keyed tubular baffle 71. This also less preferred and only provides compatibility and no orientation, but nevertheless also similarly provides the postless structure for clearing the baffle key projection to allow the filter element to still interfit with the keyed tubular baffle.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element configured for receipt into a keyed tubular baffle having a tubular extension defining a plurality of pores, the tubular extension comprises first and second open ends, a cap portion coupled to one of the first and second open ends, the cap portion comprising an end plate with a post projecting from one side that provides a hollow receiver, a key projection along the post and projecting inwardly in the hollow receiver, the filter element comprising:

a filter media comprising a ring with an internal central flow passage, wherein the ring of the filter media comprises a tubular filter media extension with the internal central flow passage having a first stage end and a second stage end, the second stage end sized to be received within the tubular baffle;

a seal disposed along the tubular filter media extension between the first stage end and the second stage end to separate a first filter stage and a second filter stage;

a first stage end cap closing the first stage end of the tubular filter media extension;

a second stage end cap closing the second stage end of the tubular filter media extension, the second stage end cap being closed to fluid flow; and means at the second stage end cap for clearing the key projection to allow the filter element to interfit with the keyed tubular baffle, wherein the clearing means is configured to avoid keying with the key projection, wherein the second stage end cap is key free and wherein the second stage end cap is configured such that no part of the keyed tubular baffle is received into the second stage end cap, in use.

2. The filter element of claim 1, wherein the second stage end cap is free of a mounting post to provide the clearing means.

3. The filter element of claim 1, wherein the second stage end cap is configured to rest on the tubular baffle along at least one of the cap portions and the tubular extension when installed into the tubular baffle.

4. The filter element of claim 1, wherein the second end cap comprises a mounting post that is sufficiently smaller than the hollow receiver with the key projection projecting inwardly in the hollow receiver to be able to clear the key projection and to be received into the hollow receiver.

5. The filter element of claim 4, wherein the mounting post is circular.

6. The filter element of claim 4, wherein the mounting post is rectangular.

7. The filter element of claim 1, further comprising a handle on the first stage end cap.

8. The filter element of claim 1, wherein the tubular filter media extension is either: (a) a single continuous extension of filter media; or (b) a composite of at least two filter sections.

9. A filter and baffle assembly comprising the filter element of claim 1 in combination with the tubular baffle.

10. A multiple stage filter element assembly comprising the filter and baffle assembly of claim 9, and further comprising:

a filtration vessel;

a partition dividing the filtration vessel the filtration vessel into a first stage and a second stage, at least one opening in the partition;

an inlet port in fluid communication with the first stage;

an outlet port in fluid communication with the second stage;

the filter element disposed in the vessel and extending through the partition, the tubular baffle surrounding the filter element and being secured by a support grid, the support grid providing a mounting opening receiving the post and a corresponding key keying with the tubular baffle, wherein the key rotationally locks the tubular baffle relative to the filtration vessel, providing a predetermined orientation to the tubular baffle.

11. A filter element, comprising:

a filter media comprising a ring with an internal central flow passage, wherein the ring of the filter media comprises a tubular filter media extension with the internal central flow passage having a first stage end and a second stage end, the second stage end:

a seal disposed along the tubular filter media extension between the first stage end and the second stage end to separate a first filter stage and a second filter stage:

a first stage end cap closing the first stage end of the tubular filter media extension;

a second stage end cap closing the second stage end of the tubular filter media extension, the second stage end cap being closed to fluid flow; and wherein the second stage end cap is free of any mounting post and free of any post-receiver.

12. The filter element of claim 11, wherein the filter element is configured for receipt into a keyed tubular baffle, the key tubular baffle having a hollow post receiver and a key projection projecting inwardly in the hollow post receiver, wherein all portions of the second stage end cap are configured to remain outside of the hollow post receiver.

13. The filter element of claim 12, wherein the second stage end cap is configured to rest on the tubular baffle along at least one of the cap portions and the tubular extension when installed into the tubular baffle.

14. The filter element of claim 11, further comprising a handle on the first stage end cap.

15. The filter element of claim 11, wherein the tubular filter media extension is either: (a) a single continuous extension of filter media; or (b) a composite of at least two filter sections.

16. A filter and baffle assembly comprising the filter element of claim 11 in combination with a tubular baffle.

17. A multiple stage filter element assembly comprising the filter and baffle assembly of claim 16, and further comprising:

a filtration vessel;

a partition dividing the filtration vessel the filtration vessel into a first stage and a second stage, at least one opening in the partition;

an inlet port in fluid communication with the first stage;

an outlet port in fluid communication with the second stage;

the filter element disposed in the vessel and extending through the partition, the tubular baffle surrounding the filter element and being secured by a support grid, the support grid providing a mounting opening receiving the post and a corresponding key keying with the tubular baffle, wherein the key rotationally locks the tubular baffle relative to the filtration vessel, providing a predetermined orientation to the tubular baffle.

18. A filter element, configured for receipt into a keyed tubular baffle having a hollow post receiver and a key projection projecting inwardly in the hollow post receiver, the filter element comprising:
- a filter media comprising a ring with an internal central flow passage, wherein the ring of the filter media comprises a tubular filter media extension with the internal central flow passage having a first stage end and a second stage end, the second stage end;
- a seal disposed along the tubular filter media extension between the first stage end and the second stage end to separate a first filter stage and a second filter stage;
- a first stage end cap closing the first stage end of the tubular filter media extension; and
- a second stage end cap closing the second stage end of the tubular filter media extension, the second stage end cap being closed to fluid flow; and
- wherein the second stage end cap comprises a mounting post that is sufficiently smaller than the hollow post receiver to be inserted into the hollow post receiver but also to avoid keying with the key projection in the hollow post receiver.

19. The filter element of claim 18, further comprising a handle on the first stage end cap.

20. The filter element of claim 18, wherein the tubular filter media extension is either: (a) a single continuous extension of filter media; or (b) a composite of at least two filter sections.

21. A filter and baffle assembly comprising the filter element of claim 18 in combination with a tubular baffle.

22. A multiple stage filter element assembly comprising the filter and baffle assembly of claim 21, and further comprising:
- a filtration vessel;
- a partition dividing the filtration vessel the filtration vessel into a first stage and a second stage, at least one opening in the partition;
- an inlet port in fluid communication with the first stage;
- an outlet port in fluid communication with the second stage;
- the filter element disposed in the vessel and extending through the partition, the tubular baffle surrounding the filter element and being secured by a support grid, the support grid providing a mounting opening receiving the post and a corresponding key keying with the tubular baffle, wherein the key rotationally locks the tubular baffle relative to the filtration vessel, providing a predetermined orientation to the tubular baffle.

* * * * *